(12) United States Patent
Sugai et al.

(10) Patent No.: US 11,882,483 B2
(45) Date of Patent: Jan. 23, 2024

(54) WIRELESS COMMUNICATION DEVICE AND METHOD FOR MULTI BAND OPERATIONS (MBO)

(71) Applicant: Sony Group Corporation, Tokyo (JP)

(72) Inventors: Ren Sugai, Tokyo (JP); Yusuke Tanaka, Tokyo (JP); Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 56 days.

(21) Appl. No.: 17/624,366

(22) PCT Filed: Jun. 26, 2020

(86) PCT No.: PCT/JP2020/025164
§ 371 (c)(1),
(2) Date: Jan. 3, 2022

(87) PCT Pub. No.: WO2021/006064
PCT Pub. Date: Jan. 14, 2021

(65) Prior Publication Data
US 2022/0361043 A1 Nov. 10, 2022

(30) Foreign Application Priority Data
Jul. 10, 2019 (JP) .................. 2019-128567

(51) Int. Cl.
*H04W 28/12* (2009.01)
*H04L 5/00* (2006.01)
*H04L 47/34* (2022.01)

(52) U.S. Cl.
CPC ........... *H04W 28/12* (2013.01); *H04L 5/0044* (2013.01); *H04L 47/34* (2013.01)

(58) Field of Classification Search
CPC ... H04L 1/1621; H04L 1/1628; H04L 1/1635; H04L 1/1642; H04L 1/1841; H04L 47/34;
(Continued)

(56) References Cited

U.S. PATENT DOCUMENTS

2013/0268628 A1* 10/2013 Zhu ................. H04L 5/0032
709/217
2016/0302229 A1* 10/2016 Hedayat ............ H04L 69/324
(Continued)

FOREIGN PATENT DOCUMENTS

JP 2006-129393 A 5/2006
JP 2010-135909 A 6/2010
(Continued)

OTHER PUBLICATIONS

International Search Report and Written Opinion dated Oct. 6, 2020, received for PCT Application PCT/JP2020/025164, Filed on Jun. 26, 2020, 9 pages including English Translation.

*Primary Examiner* — Pao Sinkantarakorn
(74) *Attorney, Agent, or Firm* — XSENSUS LLP

(57) ABSTRACT

The present technology relates to a wireless communication device and a method that enable reliable transmission of data even in communication using a plurality of bands. The wireless communication device collectively manages a sequence number of data transmitted using each band in communication using a plurality of bands and controls of transmission of information on a notification method of a reception result of the data and information on a management method. The present technology can be applied to wireless communication systems.

19 Claims, 34 Drawing Sheets

(58) Field of Classification Search
CPC .. H04L 49/9057; H04W 28/12; H04W 28/16;
H04W 28/18; H04W 76/15
See application file for complete search history.

(56) References Cited

U.S. PATENT DOCUMENTS

| | | |
|---|---|---|
| 2018/0205502 A1 | 7/2018 | Merlin et al. |
| 2019/0364555 A1* | 11/2019 | Huang ................ H04W 72/51 |
| 2020/0077417 A1* | 3/2020 | Seok .................... H04W 28/04 |
| 2020/0288523 A1* | 9/2020 | Patil ..................... H04W 76/15 |
| 2022/0312521 A1* | 9/2022 | Song .................... H04L 5/00 |

FOREIGN PATENT DOCUMENTS

| | | |
|---|---|---|
| JP | 2013-215010 A | 10/2013 |
| JP | 2015-136139 A | 7/2015 |

* cited by examiner

1, #4, #7Requeue

WIRELESS COMMUNICATION DEVICE AND METHOD FOR MULTI BAND OPERATIONS (MBO)

CROSS-REFERENCE TO RELATED APPLICATIONS

The present application is based on PCT filing PCT/JP2020/025164, filed Jun. 26, 2020, which claims priority to Japanese Application No. 2019-128567, filed Jul. 10, 2019, the entire contents of each are incorporated herein by reference.

TECHNICAL FIELD

The present technology relates to wireless communication devices and methods, and more particularly to wireless communication devices and methods that enable reliable transmission of data even in communication using a plurality of bands.

BACKGROUND ART

There is an increasing demand for wireless communication with high transmission speed and high communication quality. In order to realize a high transmission speed, for example, it is known to perform communication using a plurality of frequency bands (hereinafter, also referred to simply as bands).

For example, in wireless communication, a plurality of bands are allocated to an unlicensed band in which it is necessary to perform Listen Before Talk to check whether the band is being used before transmission. Wireless communication that realizes high transmission speed using these multiple bands is expected in the future. PTL 1 proposes a communication method that simultaneously uses a plurality of bands assuming a wireless LAN (Local Area Network).

CITATION LIST

Patent Literature

[PTL 1]
JP 2015-136139 A

SUMMARY

Technical Problem

As in the conventional case, when the sequence number of data is managed for each band and the transmission right is acquired in a plurality of bands, the transmission timing may be different for each band.

In such a case, even if the sequence numbers of data are collectively managed in a plurality of bands, the order of retransmission for the sequence numbers is disrupted depending on the time of the start of packet transmission and the completion of packet transmission. In addition, there is a risk that the receiving side will process the data as if there is no data arriving later.

The present technology has been made in view of the above-described problems and an object thereof is to reliably transmit data even in communication using a plurality of bands.

Solution to Problem

A wireless communication device according to an aspect of the present technology includes a transmission control unit that collectively manages a sequence number of data transmitted using each band in communication using a plurality of bands and controls transmission of information on a notification method of a reception result of the data and information on a management method.

A wireless communication device according to another aspect of the present technology includes a reception control unit that controls reception of information on a notification method of a reception result of data and information on a management method, the data being transmitted such that a sequence number of data transmitted using each band in communication using a plurality of bands is collectively managed; and a transmission control unit that controls transmission of the reception result using a band in which the information on the notification method is received.

In one aspect of the present technology, a sequence number of data transmitted using each band is collectively managed in communication using a plurality of bands and information on a notification method of a reception result of the data and information on a management method are transmitted.

In another aspect of the present technology, information on a notification method of a reception result of data and information on a management method are received, the data being transmitted such that a sequence number of data transmitted using each band in communication using a plurality of bands is collectively managed, and the reception result is transmitted using a band specified in the information on the notification method.

DESCRIPTION OF EMBODIMENTS

Hereinafter, embodiments of the present technology will be described. Note that the description will be given in the following order.

1. Conventional Art
2. Configuration of Present Technology
3. First Embodiment
4. Second Embodiment
5. Others 1. Conventional Art <Configuration Example of Wireless Communication System>

Figure 1:
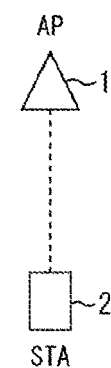
FIG. 1 is a diagram showing a configuration example of a conventional wireless communication system.

FIG. 1 is a diagram showing a configuration example of a conventional wireless communication system.

The wireless communication system of FIG. 1 is configured by connecting a base station (AP) to a terminal (STA) by wireless communication.

The base station (AP) is configured of the wireless communication device 1. The terminal (STA) is configured of a wireless communication device 2. Hereinafter, the base station (AP) is referred to simply as an AP, and the terminal (STA) is referred to simply as a STA.

The AP communicates with the STA using two or more frequency bands (hereinafter referred to as bands).

<Example of Conventional Operation Sequence>

Figure 2:
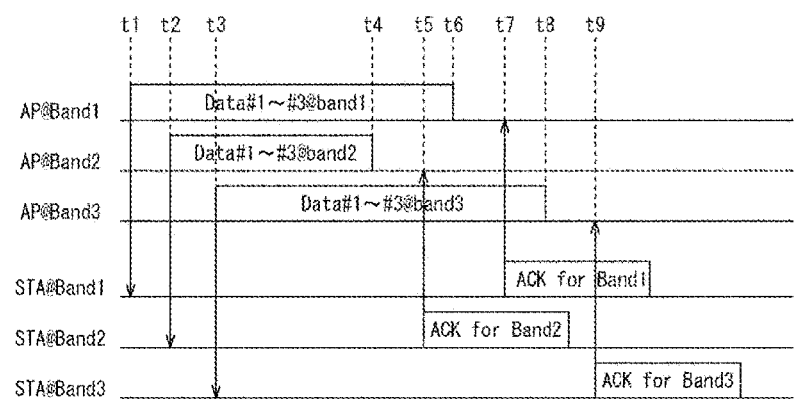
FIG. 2 is a diagram showing an example of an operation sequence of a conventional wireless communication system.

FIG. 2 is a diagram showing an example of an operation sequence of a conventional wireless communication system.

FIG. 2 shows an operation sequence when the sequence numbers of data are independently managed for each of a plurality of bands. FIG. 2 shows an example in which the AP, which is the wireless communication device 1, and the STA, which is the wireless communication device 2, communicate using three bands.

Here, the AP and the STA communicate using a first band, a second band, and a third band. In FIG. 2, the sequence of the first band, the second band, and the third band of the AP is indicated by AP@Band1, AP@Band2, and AP@Band3, respectively. The sequence of the first band, the second band, and the third band of STA is indicated by STA@Band1, STA@Band2, and STA@Band3, respectively. Data #1 to #3 represent data packets whose sequence numbers are #1, #2, and #3. The same applies to the following drawings.

"@Band1" in "Data #1 to #3@Band1" indicates that the sequence number is managed in the first band.

At time t1, the AP acquires the transmission right in the first band and starts transmitting the signal of Data #1 to #3@Band1 using the first band. In response to the start of transmission by the AP, the STA starts receiving the signal of Data #1 to #3@Band1 using the first band at time t1.

At time t2, the AP acquires the transmission right in the second band and starts transmitting the signal of Data #1 to #3@Band2 using the second band. In response to the start of transmission by the AP, the STA starts receiving the signal of Data #1 to #3@Band2 using the second band at time t2.

At time t3, the AP acquires the transmission right in the third band and starts transmitting the signal of Data #1 to #3@Band3 using the third band. In response to the start of transmission by the AP, the STA starts receiving the signal of Data #1 to #3@Band3 using the third band at time t3.

At time t4, the AP completes the transmission of the signal of Data #1 to #3@Band2 using the second band. At time t4, the STA completes the reception of the signal of Data #1 to #3@Band2 using the second band. At time t5, the STA returns ACK for Band1 for the signal of Data #1 to 3@Band2 to the AP using the second band.

At time t6, the AP completes the transmission of the signal of Data #1 to #3@Band1 using the first band. At time t6, the STA completes the reception of the signal of Data #1 to #3@Band1 using the first band. At time t7, the STA returns ACK for Band1 for the signal of Data #1 to #3@Band1 to the AP using the first band.

At time t8, the AP completes the transmission of the signal of Data #1 to #3@Band3 using the third band. At time t8, the STA completes the reception of the signal of Data #1 to #3@Band3 using the third band. At time t9, the STA returns ACK for Band3 for the signal of Data #1 to #3@Band3 to the AP using the third band.

Here, the management of the sequence number is performed, for example, in an MAC layer.

Therefore, when data is managed with independent sequence numbers for each band, the AP may require a control unit that performs processing for managing the same number of sequence numbers as the number of multiple bands for communication. When the transmission right is acquired in a plurality of bands, the timings of the start and the completion of transmission are different as shown in FIG. 2.

Figure 3:
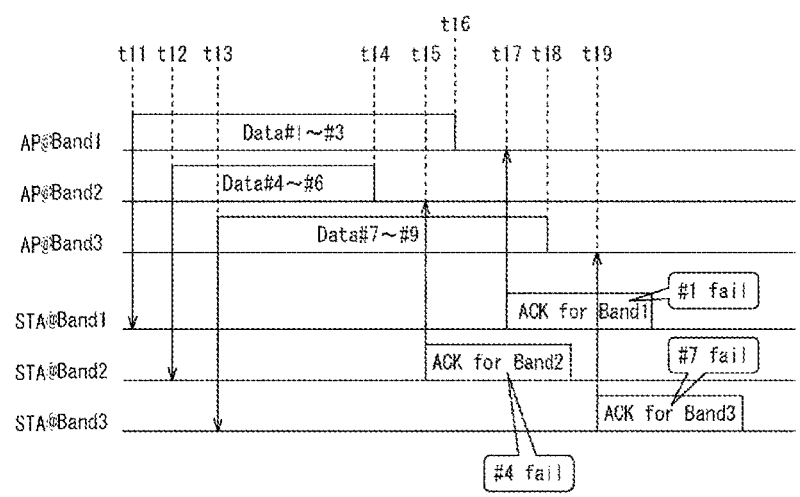
FIG. 3 is a diagram showing another example of an operation sequence of the conventional wireless communication system.

FIG. 3 is a diagram showing another example of the operation sequence of the conventional wireless communication system.

FIG. 3 shows an operation sequence when the sequence numbers of data in a plurality of bands are collectively managed.

Figure 4:
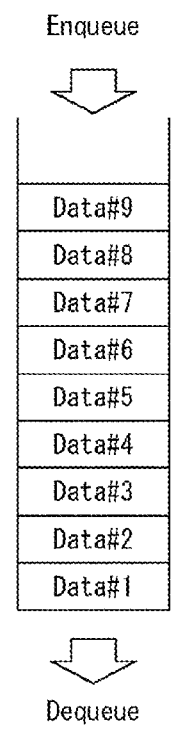
FIG. 4 is a diagram showing an example of a transmission queue.

The AP has a transmission queue as shown in FIG. 4. For example, data packets of Data #1 to #9 are sequentially input to the transmission queue.

At time t11, the AP acquires the transmission right in the first band and starts transmitting the signal of Data #1 to #3 using the first band. At that time, the packets of Data #1 to #3 are taken out from the transmission queue of FIG. 4 in the order of input. In response to the start of transmission by the AP, the STA starts receiving the signal made up of the packets of Data #1 to #3 using the first band at time t11.

At time t12, the AP acquires the transmission right in the second band and starts transmitting the signal of Data #4 to #6 using the second band. At that time, the packets of Data #4 to #6 are taken out from the transmission queue of FIG. 4 in the order of input. In response to the start of transmission by the AP, the STA starts receiving the signal made up of the packets of Data #4 to #6 using the second band at time t12.

At time t13, the AP acquires the transmission right in the third band and starts transmitting the signal of Data #7 to #9 using the third band. At that time, the packets of Data #7 to #9 are taken out from the transmission queue of FIG. 4 in the order of input. In response to the start of transmission by the AP, the STA starts receiving the signal made up of the packets of Data #7 to #9 using the third band at time t13.

At time t14, the AP completes the transmission of the signal of Data #4 to #6 using the second band. At time t14, the STA completes the reception of the signal of Data #4 to #6 using the second band. At this time, it is assumed that the STA fails to receive the signal of Data #4.

Figure 5:
FIG. 5 is a diagram showing an example of a transmission queue.

At time t15, the STA returns an ACK for Band2 for the signal of Data #5 and #6 to the AP using the second band. When the transmission of Data #1 to Data #9 is completed, as shown in FIG. 5, the signal of Data #10 to #15 is sequentially input to the transmission queue of the AP. With ACK for Band2, the AP grasps the failure of the STA to receive the signal of Data #4, and causes the packet of Data #4 to be re-input to the start (before Data #10) of the transmission queue of FIG. 5.

At time t16, the AP completes the transmission of the signal of Data #1 to #3 using the first band. At time t16, the STA completes the reception of the signal of Data #1 to #3 using the first band. At this time, it is assumed that the STA fails to receive the signal of Data #1.

At time t17, the STA returns an ACK for Band1 for the signal of Data #2 and #3 to the AP using the first band. With ACK for Band1, the AP grasps the failure of the STA to receive the signal of Data #1 and causes the packet of Data #1 to be re-input to the start (before Data #4) of the transmission queue of FIG. 5.

At time t18, the AP completes the transmission of the signal of Data #7 to #9 using the third band. At time t18, the STA completes the reception of the signal of Data #7 to #9 using the third band. At this time, it is assumed that the STA fails to receive the signal of Data #7.

At time t19, the STA returns an ACK for Band3 for the signal of Data #8 and #9 to the AP using the third band. With ACK for Band3, the AP grasps the failure of the STA to receive the data of Data #7, and causes the packet of Data #7 to be re-input to the start (before Data #1) of the transmission queue of FIG. 5.

As a result, as shown in FIG. 5, packets are contained in the transmission queue in the order of Data #7, Data #1, Data #4, Data #10, and so on. Therefore, the AP could not retransmit the packet in the order of the sequence numbers of Data #1, Data #4, and Data #7.

Figure 6:
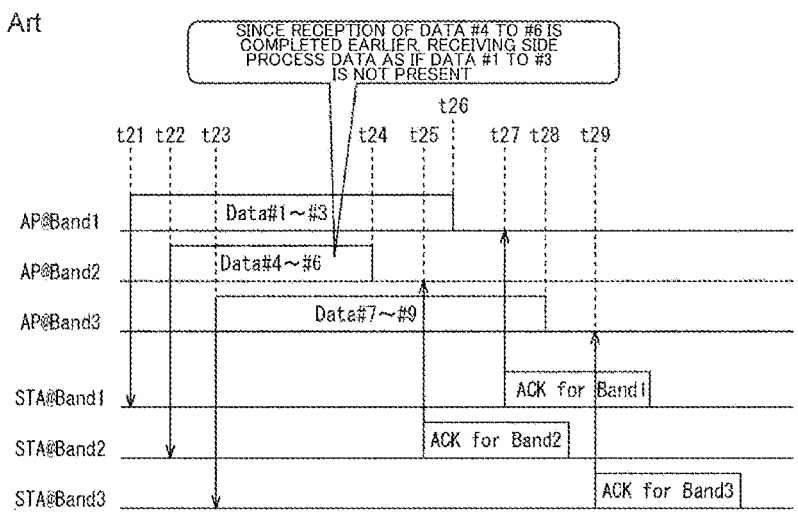
FIG. 6 is a diagram showing still another example of an operation sequence of the conventional wireless communication system.

FIG. 6 is a diagram showing still another example of the operation sequence of the conventional wireless communication system.

FIG. 6 shows an operation sequence when the sequence numbers of data in a plurality of bands are collectively managed as in the case of FIG. 3.

At time t21, the AP acquires the transmission right in the first band and starts transmitting the signal of Data #1 to #3 using the first band. In response to the start of transmission by the AP, the STA starts receiving the signal of Data #1 to #3 using the first band at time t21.

At time t22, the AP acquires the transmission right in the second band and starts transmitting the signal of Data #4 to #6 using the second band. In response to the start of transmission by the AP, the STA starts receiving the signal of Data #4 to #6 using the second band at time t22.

At time t23, the AP acquires the transmission right in the third band and starts transmitting the signal of Data #7 to #9 using the third band. In response to the start of transmission by the AP, the STA starts receiving the signal of Data #7 to #9 using the third band at time t23.

At time t24, the AP completes the transmission of the signal of Data #4 to #6 using the second band. At time t24, the STA completes the reception of the signal of Data #4 to #6 using the second band. At this time, the reception of the signal of Data #4 to #6 whose transmission started later is completed before the signal of Data #1 to #3 whose transmission started earlier. Therefore, the STA may process the signal of Data #4 to #6 assuming that there is no signal of Data #1 to #3.

Therefore, in the present technology, in the communication using a plurality of bands, the AP collectively manages the sequence numbers of the data transmitted using each band, and transmits information on a data reception result notification method and information on a management method.

In this way, communication using a plurality of bands can be realized in one MAC layer as in the conventional 802.11 standard.

The order of the sequence numbers during retransmission is not disturbed, and it is possible to prevent data from being discarded due to different timings of the start and the completion of transmission. Therefore, according to the present technology, data can be reliably transmitted even in communication using a plurality of bands.

2. Configuration of Present Technology

<Configuration Example of Wireless Communication System>

Figure 7:
FIG. 7 is a diagram showing a configuration example of a wireless communication system according to an embodiment of the present technology.

FIG. 7 is a diagram showing a configuration example of a wireless communication system according to an embodiment of the present technology.

Similarly to the wireless communication system of FIG. 1, the wireless communication system of FIG. 7 is configured by connecting the AP to the STA by wireless communication. The AP communicates with the STA using a plurality of bands.

The AP is configured of a wireless communication device 11. The STA is configured of a wireless communication device 12.

<Device Configuration Example>

Figure 8:
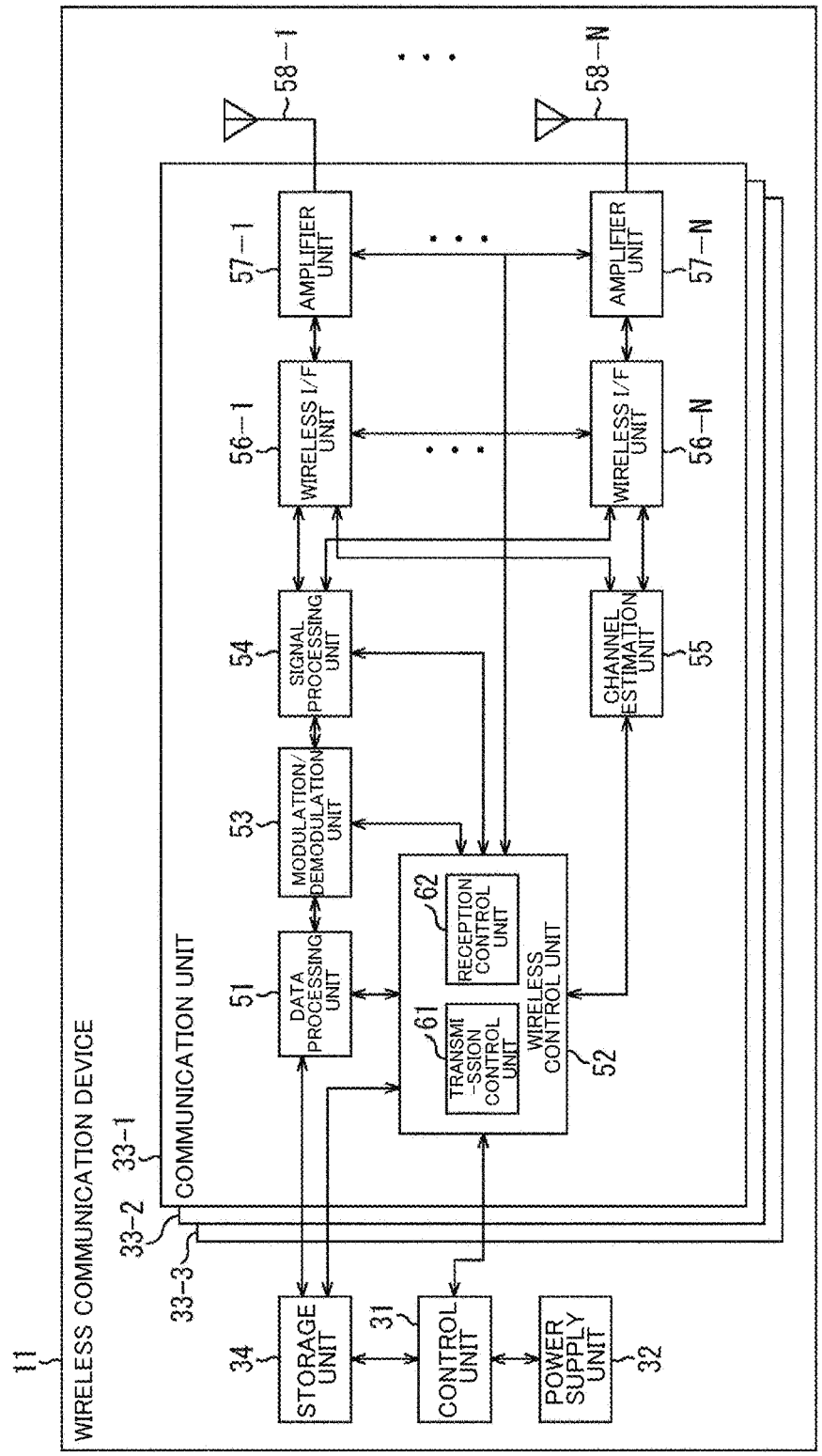
FIG. 8 is a block diagram showing a configuration example of a wireless communication device.

FIG. 8 is a block diagram showing a configuration example of the wireless communication device 11.

The wireless communication device 11 shown in FIG. 8 is a device that operates as an AP.

The wireless communication device 11 includes a control unit 31, a power supply unit 32, communication units 33-1 to 33-3, and a storage unit 34. In the example of FIG. 8, three communication units 33-1 to 33-3 are included. The communication units 33-1 to 33-3 may be realized as an LSI.

The communication units 33-1 to 33-3 each transmit and receive data. The communication units 33-1 to 33-3 each include a data processing unit 51, a wireless control unit 52, a modulation/demodulation unit 53, a signal processing unit 54, a channel estimation unit 55, a wireless interface (I/F) unit 56-1 to 56-N, amplifier units 57-1 to 57-N, and antennas 58-1 to 58-N.

For the wireless I/F units 56-1 to 56-N, the amplifier units 57-1 to 57-N, and the antennas 58-1 to 58-N, those having the same branch number may form a set, and each set may be configured as one component. The functions of the amplifier units 57-1 to 57-N may be included in the wireless I/F units 56-1 to 56-N, respectively.

Hereinafter, the communication units 33-1 to 33-3 are referred to simply as a communication unit 33 when it is not necessary to distinguish them. The wireless I/F units 56-1 to 56-N, the amplifier units 57-1 to 57-N, and the antennas 58-1 to 58-N are referred to simply as a wireless I/F unit 56, an amplifier unit 57, and an antenna 58 as appropriate when it is not necessary to distinguish them.

The control unit 31 is configured of a CPU (Central Processing Unit), a ROM (Read Only Memory), a RAM (Random Access Memory), and the like. The control unit 31 executes a program stored in the ROM, the storage unit 34, or the like, and controls the power supply unit 32 and the wireless control unit 52 of each communication unit 33. The control unit 31 collectively manages the sequence numbers of each communication unit 33.

The power supply unit 32 is configured of a battery or a fixed power supply, and supplies electric power to the entire wireless communication device 11.

The storage unit 34 has a single transmission queue. Packets of necessary data corresponding to a transmittable time are extracted from the transmission queue in the order of input to the transmission queue.

During transmission, the data processing unit 51 generates a packet for wireless transmission using the data supplied from an upper layer. The data processing unit 51 performs processing such as adding a header for media access control (MAC) and adding an error detection code to the generated packet, and stores the processed data in the transmission queue of the storage unit 34 according to the control of the wireless communication unit 52. According to the wireless communication unit 52, the data processing unit 51 outputs data corresponding to a transmittable time from the transmission queue of the storage unit 34 to the modulation/demodulation unit 53.

During reception, the data processing unit 51 performs MAC header analysis, packet error detection, reorder processing, and the like on the data supplied from the modulation/demodulation unit 53, and outputs the processed data to its upper layer.

The wireless control unit 52 transfers information between respective units of the wireless communication device 11 and data between the storage unit 34 and the data processing unit 51, and controls each unit in the communication unit 33. The wireless control unit 52 includes a transmission control unit 61 and a reception control unit 62.

During transmission, the transmission control unit 61 sets parameters of the modulation/demodulation unit 53 and the signal processing unit 54, schedules packets in the data processing unit 51, sets parameters of the wireless I/F unit 56 and the amplifier unit 57, and controls transmission power as necessary. During reception, the reception control unit 62 sets parameters of the modulation/demodulation unit 53 and the signal processing unit 54 and sets parameters of the wireless I/F unit 56 and the amplifier unit 57 as necessary.

In particular, when communication is performed using a plurality of bands, the transmission control unit 61 controls each unit according to the control of the control unit 31 so that the sequence numbers of the data to be transmitted in each band are collectively managed and transmitted. The transmission control unit 61 controls each unit so that information on a reception result notification method and information on a management method are transmitted.

The reception control unit 62 controls each unit so that the reception result is transmitted using a specific band.

At least a part of these operations of the wireless control unit 52 may be performed by the control unit 31 instead of the wireless control unit 52. The control unit 31 and the wireless control unit 52 may be configured as one block.

During transmission, the modulation/demodulation unit 53 encodes, interleaves, and modulates the data supplied from the data processing unit 51 on the basis of the coding method and the modulation method set by the control unit 31 and generates a data symbol stream. The modulation/demodulation unit 53 outputs the generated data symbol stream to the signal processing unit 54.

During reception, the modulation/demodulation unit 53 outputs the data obtained as a result of demodulating, deinterleaving, and decoding the data symbol stream supplied from the signal processing unit 54 to the data processing unit 51 or the wireless control unit 52.

During transmission, the signal processing unit 54 performs signal processing for spatial separation on the data symbol stream supplied from the modulation/demodulation unit 53 as necessary, and outputs one or more transmission symbol streams obtained as a result of the signal processing to each wireless I/F unit 56.

During reception, the signal processing unit 54 performs signal processing on the reception symbol stream supplied from each wireless I/F unit 56, spatially separates the stream as necessary, and outputs a data symbol stream obtained as a result of the spatial separation to the modulation/demodulation unit 53.

The channel estimation unit 55 calculates complex channel gain information of a propagation path from a preamble portion and a training signal portion of the reception symbol stream supplied from each wireless I/F unit 56. The complex channel gain information is supplied to the modulation/demodulation unit 53 and the signal processing unit 54 via the wireless control unit 52, and is used for the demodulation processing in the modulation/demodulation unit 53 and the spatial separation processing in the signal processing unit 54.

During transmission, the wireless I/F unit 56 converts the transmission symbol stream from the signal processing unit 54 into an analog signal, performs filtering, up-conversion to a carrier frequency, and phase control, and outputs the analog signal after the phase control to the amplifier unit 57.

During reception, the wireless I/F unit 56 performs phase control, down-conversion, and reverse filtering on the analog signal supplied from the amplifier unit 57, and outputs a reception symbol stream obtained as a result of conversion to digital signals to the signal processing unit 54 and the channel estimation unit 55.

During transmission, the amplifier unit 57 amplifies the analog signal supplied from the wireless I/F unit 56 to a predetermined power, and outputs the power-amplified analog signal to the antenna 58. During reception, the amplifier unit 57 amplifies the analog signal supplied from the antenna 58 to a predetermined power, and outputs the power-amplified analog signal to the wireless I/F unit 56.

At least a part of at least one of a transmission function and a reception function of the amplifier unit 57 may be included in the wireless I/F unit 56. At least a part of at least one of the functions of the amplifier unit 57 may be a component outside the communication unit 33.

Since the configuration of the wireless communication device 12 that operates as the STA is basically the same as that of the wireless communication device 11, the configuration of the wireless communication device 11 will be used in the description of the wireless communication device 12.

In this case, the reception control unit 62 receives information on the reception result notification method and information on the management method used for communication in a plurality of bands, and controls each unit so as to receive the Data signal transmitted using the plurality of bands. The transmission control unit 61 controls each unit so as to transmit the data reception result using the band in which the information on the notification method is received.

3. First Embodiment

First, as the first embodiment, a case where a signal requesting a reception result corresponding to a sequence number of data collectively managed in a plurality of bands is transmitted in a specific band will be described. The sequence number is managed, for example, in the MAC layer, but may be managed in a layer higher than the MAC layer.

<Example of Sequence During Association>

Figure 9:
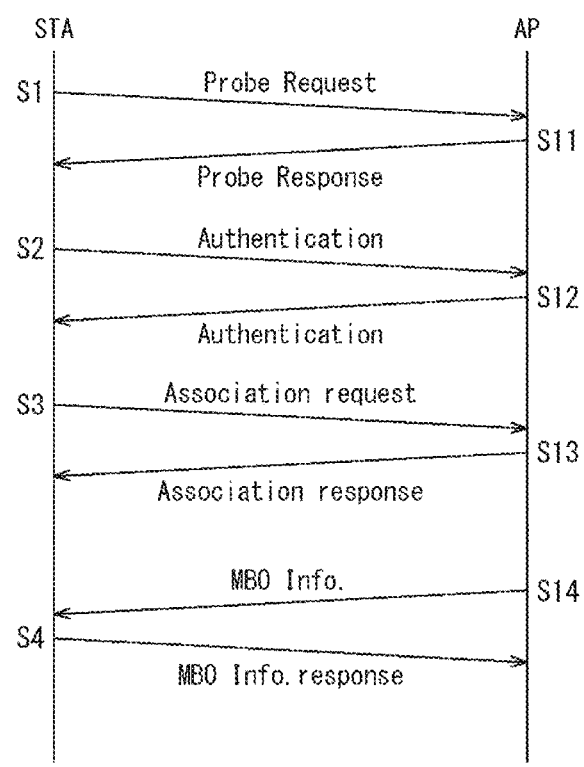
FIG. 9 is a diagram showing an example of a sequence during association of the wireless communication system of FIG. 7.

FIG. 9 is a diagram showing an example of a sequence during association of the wireless communication system of FIG. 7.

FIG. 9 shows an operation sequence during association when the AP transmits information necessary for MBO (Multi Band Operation) to the STA. This sequence is performed using a certain band among a plurality of bands.

The STA transmits a probe request in step S1. The probe request includes, for example, a network name, Capability information indicating the capability (function) of the STA, and the like.

The AP receives the probe request from the STA. If the network name included in the probe request is the same as the network name of the AP, the AP transmits a probe response in step S11. The probe response includes, for example, Capability information indicating the capability (function) of the AP.

Upon receiving the probe response, the STA authenticates the AP in step S2. In response to the authentication from the STA, the AP authenticates the STA in step S12.

When the mutual authentication is completed, the STA transmits an association require in step S3. Upon receiving the association require from the STA, the AP transmits an association response in step S13.

When the AP transmits an association response and the association with the STA is completed, the AP transmits MBO information (MBO Info.) in step S14. The MBO information is a signal in which the collective management information of the sequence numbers and the hold request information of the reception result are stored as the information on the management method.

The collective management information of the sequence number is one of the information on the management method, and is the information indicating that the sequence numbers of data are collectively managed and transmitted when the transmission is performed using a plurality of bands. When transmission is performed using a plurality of bands, the collective management information may be information indicating a mode in which the sequence numbers of data are collectively managed and transmitted. By receiving the collective management information of the sequence numbers, the STA transitions to a state in which transmission and reception can be performed using a plurality of bands.

The reception result hold request information is one of the information on the management method, and is information indicating that an amount of reception result corresponding to the number of bands is requested to be held.

When transmission is performed using a plurality of bands, MBO information is transmitted because it is necessary to hold up to an integral multiple of the amount of data that can be transmitted in the past until the reception result is returned. When transmitting MBO information, the amount of reception result that can be held may be transmitted at the same time.

Upon receiving the MBO information from the AP, the STA transmits an MBO information response (MBO Info-.response) in step S4. The MBO information response is one of the information on the management method, and is a signal in which the reception result holdability information indicating whether an amount of reception result specified in the MBO information can be held is stored. If the specified reception result can be held, the STA returns an MBO information response indicating that it can be held. If the specified reception result cannot be held, the STA returns an MBO information response indicating the amount that can be held.

After that, in the AP, the amount of data transmitted in a plurality of bands is determined according to the holdable amount indicated by the transmitted MBO information response.

In this way, the association between the STA and the AP is completed.

In the example of FIG. 9, an example in which the collective management information of the sequence numbers and the hold request information of the reception result are individually transmitted as MBO information is shown. These pieces of information may be transmitted along with or as part of the Capability information, for example, during the probe request or probe response described above, or may be transmitted in a state of being added to the signal of the transmitted data, as described below.

<Frame Configuration Example of MBO Info.>

Figure 10:
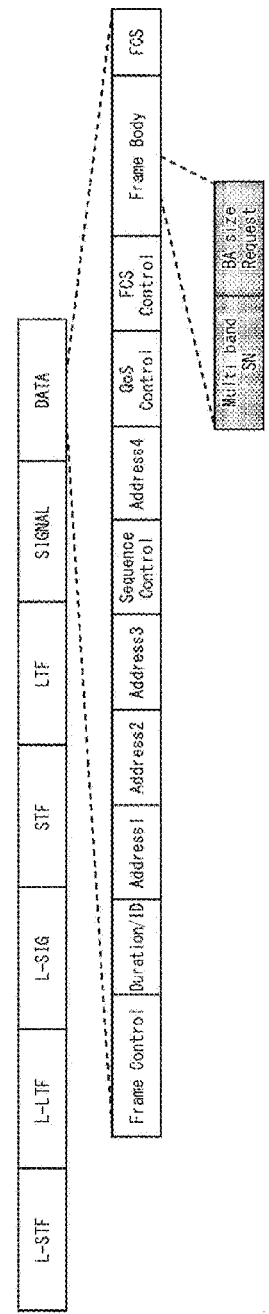
FIG. 10 is a diagram showing a frame configuration example of MBO Info.

FIG. 10 is a diagram showing an example of a frame configuration of MBO Info. The description of the same part as the conventional frame configuration will be omitted as appropriate.

The MBO Info. frame consists of a preamble consisting of L-STF, L-LTE, L-SIG, STF, LTF, and SIGNAL and DATA.

DATA consists of Frame Control, Duration/ID, Address1, Address2, Address3, Sequence Control, Address4, QoS Control, FCS Control, Frame Body, and FCS.

The collective management information of the sequence number is stored in the Frame Body as Multi band SN. The reception result hold request information is stored in the Frame Body as BA size Request.

<Frame Configuration Example of MBO Info.Response>

Figure 11:
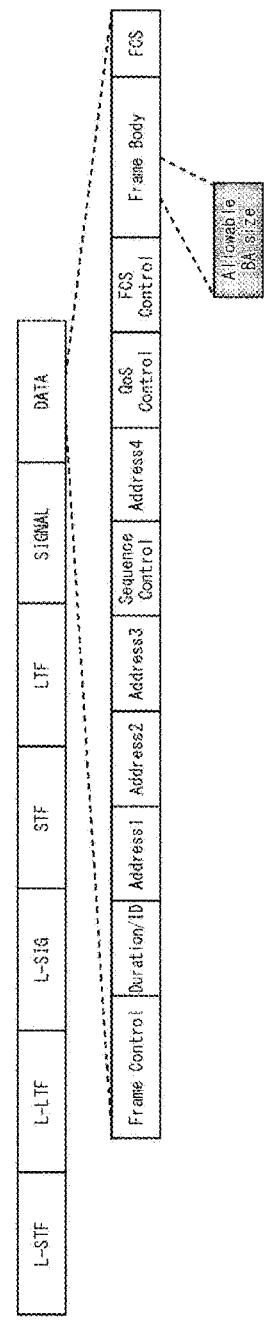
FIG. 11 is a diagram showing a frame configuration example of MBO Info.response.

FIG. 11 is a diagram showing a frame configuration example of MBO Info.response. The description of the same part as the conventional frame configuration will be omitted as appropriate.

The MBO Info.response frame is configured in the same way as the MBO Info.

The reception result holdability information is stored in the Frame Body as Allowable BA size.

<Other Examples of Sequence During Association>

In the example of FIG. 9, an example of the sequence in which AP and STA transmit information necessary for MBO during association is shown. The information required for MBO is the collective management information of the sequence number, the hold request information of the reception result, and the holdability information of the reception result.

Among the information required for MBO, the STA may voluntarily transmit the reception result holdability information to the AP. In this case, it is not necessary to have the hold request information of the reception result, and the collective management information of the sequence number is transmitted in a state of being added to data as described later.

Figure 12:
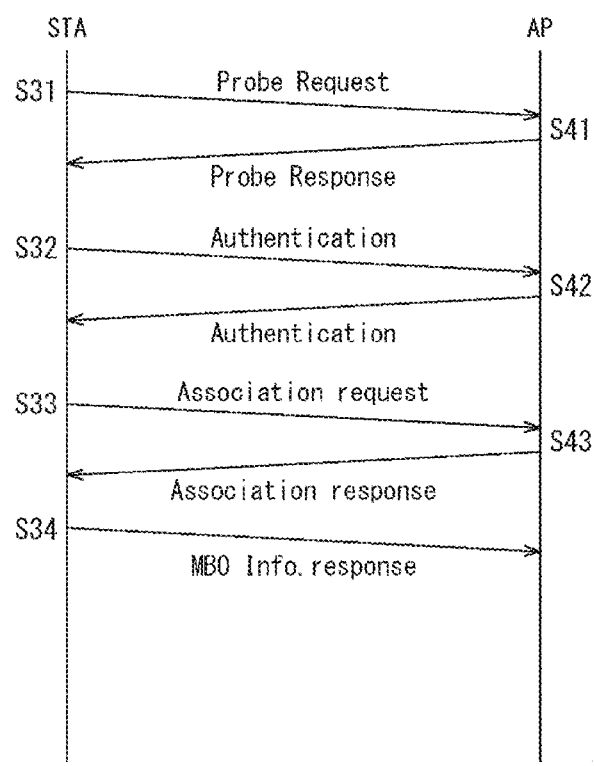
FIG. 12 is a diagram showing another example of the sequence during association in FIG. 9.

FIG. 12 is a diagram showing another example of the sequence during association of the wireless communication system of FIG. 7.

FIG. 12 shows an operation sequence during association when the STA voluntarily transmits the information necessary for the MBO to the AP.

Since steps S31 to S33 and steps S41 to 43 of FIG. 12 perform the same processing as steps S1 to S3 and steps S11 to S13 of FIG. 9, the description thereof will be omitted.

When the STA receives the association response and the association with the STA is completed, the STA transmits an MBO information response (MBO Info.response) in step S34.

As described above, the STA may voluntarily transmit the MBO information response. Also in this case, for example, the MBO information response may be transmitted along with or as part of the Capability information during association.

<Example of Sequence During Data Transmission>

Figure 13:
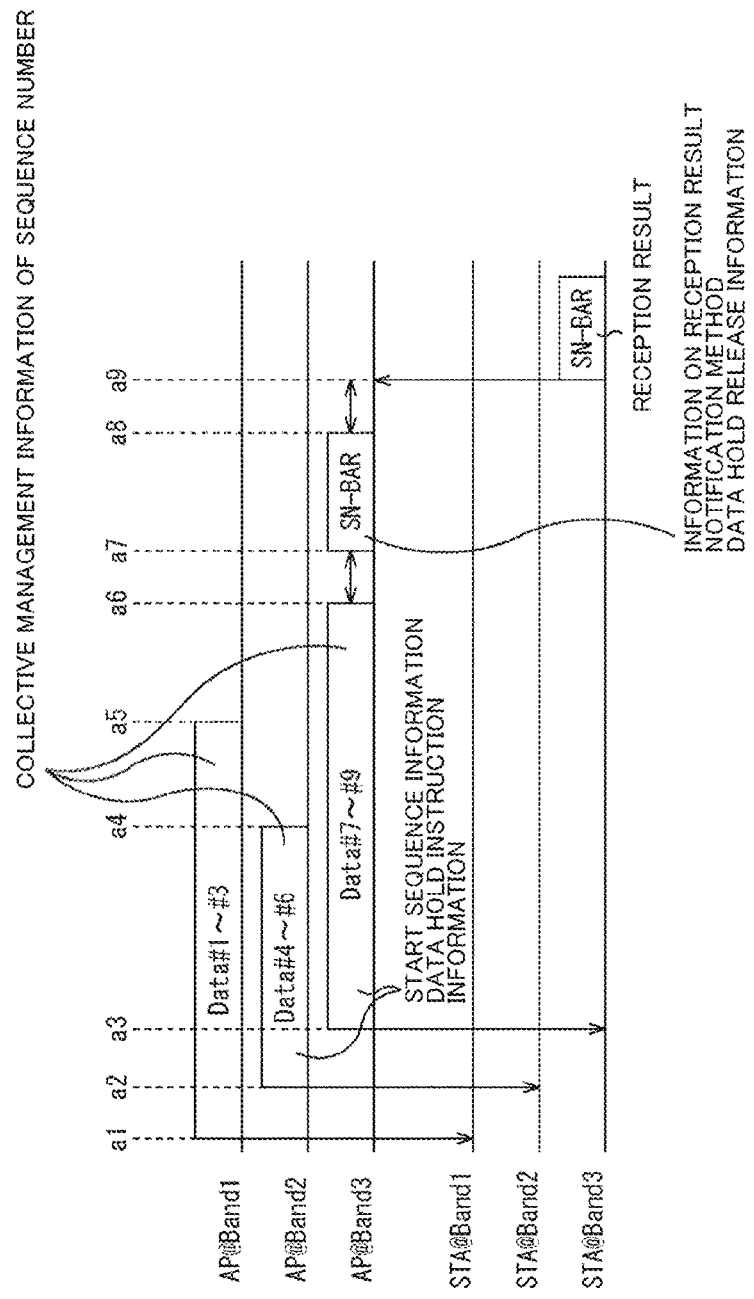
FIG. 13 is a diagram showing an example of a sequence during data transmission of the wireless communication system of FIG. 7.

FIG. 13 is a diagram showing an example of a sequence during data transmission of the wireless communication system of FIG. 7.

The data transmission in FIG. 13 is a process performed after the above-mentioned association. The double-headed arrow in FIG. 13 represents the minimum time interval (SIFS) when transmitting BAR (Block ACK Request), which is a signal requesting a reception result, and BA (Block ACK), which is a signal indicating a reception result.

At time a1, the AP acquires the transmission right in the first band and starts transmitting signals using the first band. At that time, the AP extracts necessary packets of necessary Data corresponding to a transmittable time from a single transmission queue in the order of input and transmits a signal made up of the extracted packets. The method for extracting Data packets is the same for other bands.

For example, in the first band, the extraction starts from the packet of Data #1, and the packets of Data #1 to #3 are extracted. Then, the signal of Data #1 to #3 is formed and transmitted. In response to the start of transmission by the AP, the STA starts receiving the signal of Data #1 to #3 using the first band at time a1.

After that, at time a2, the AP acquires the transmission right in the second band and starts transmitting the signal using the second band. For example, in the second band, the extraction starts from the packet of Data #4, and the packets of Data #4 to #6 are extracted. Then, the signal of Data #4 to #6 is formed and transmitted. In response to the start of transmission by the AP, the STA starts receiving the signal of Data #4 to #6 using the second band at time a2.

At time a3, the AP acquires the transmission right in the third band and starts transmitting the signal using the third band. For example, in the third band, the extraction starts from the packet of Data #7, and the packets of Data #7 to #9 are extracted. Then, the signal of Data #7 to #9 is formed and transmitted. In response to the start of transmission by the AP, the STA starts receiving the signal of Data #7 to #9 using the third band at time a3.

As described above, when data is transmitted in a plurality of bands, the sequence numbers of the data are collectively managed.

If the sequence number collective management information, which is one of the information on the management method, is not transmitted during association, it may be added to the signal transmitted in each band.

Start sequence information which is information on the sequence number of start Data or Data hold instruction information which is information instructing holding of Data regardless of the sequence number is added to the signal of the band that started the transmission later (in the case of FIG. 13, the second band and the third band), which is not the band that started the transmission first among the plurality of bands. The start sequence information or the Data hold instruction information may be stored in a physical header or after a known signal added for synchronization in the middle of Data.

The start sequence information is one of the information on the management method. The start sequence information may be information that specifically indicates the start sequence number (Data #1 in the case of FIG. 13) of the Data of the band in which transmission is performed earlier when transmission using a plurality of bands is started and may be information that simplifies the instruction information.

The Data hold instruction information is one of the information on the management method, and is the information instructing to hold the Data of the sequence number smaller than the previously received packet number even when the Data of the sequence number smaller than the received packet number is received.

Either the start sequence information or the Data hold instruction information is added to the signal in the band in which transmission started later. Due to the start sequence information or the Data hold instruction information, when the reception of the packet of the signal whose transmission started later is completed earlier than the packet of the signal whose transmission started earlier, for example, the data sequence from Data #4 can be prevented from being processed on the reception side as if there is no Data #1 to #3. By receiving the start sequence information or the Data hold instruction information, the STA determines whether the Data of the band in which transmission is performed earlier will be held or discarded.

At time a4, the AP completes the transmission of the signal of Data #4 to #6 using the second band. At time a4, the STA completes the reception of the signal of Data #4 to #6 using the second band.

At time a5, the AP completes the transmission of the signal of Data #1 to #3 using the first band. At time a5, the STA completes the reception of the signal of Data #1 to #3 using the first band.

At time a6, the AP completes the transmission of the signal of Data #7 to #9 using the third band. At time a6, the STA completes the reception of the signal of Data #7 to #9 using the third band.

The AP transmits SN-BAR (Sequence Number BAR) which is a signal requesting the reception result (Data #1 to #9) of the data transmitted so far in a plurality of divided bands at time a7 after SIFS has elapsed from the time when the transmission of the signal transmitted using a specific band (the third band in the case of FIG. 13) is completed. The method for determining the band for transmitting the SN-BAR will be described later with reference to FIG. 14.

The SN-BAR contains information on the reception result notification method. When the signal to which the Data hold instruction information is added is transmitted, the Data hold release information is also added. The Data hold release information is one of the information on the management method, and is the information for requesting the release of Data hold.

After transmitting the SN-BAR, the AP waits until the SN-BAR is received in the specified band.

The STA that has received the SN-BAR transmits the reception result (SN_BA) on the basis of the notification method specified by the SN-BAR at time a9 after SIFS has elapsed from the time when the SN-BAR is received. The notification method of SN-BA will be described later after the explanation of the frame configuration. The AP receives the SN-BAR in the specified band at time a9.

<AP Operation>

Figure 14:
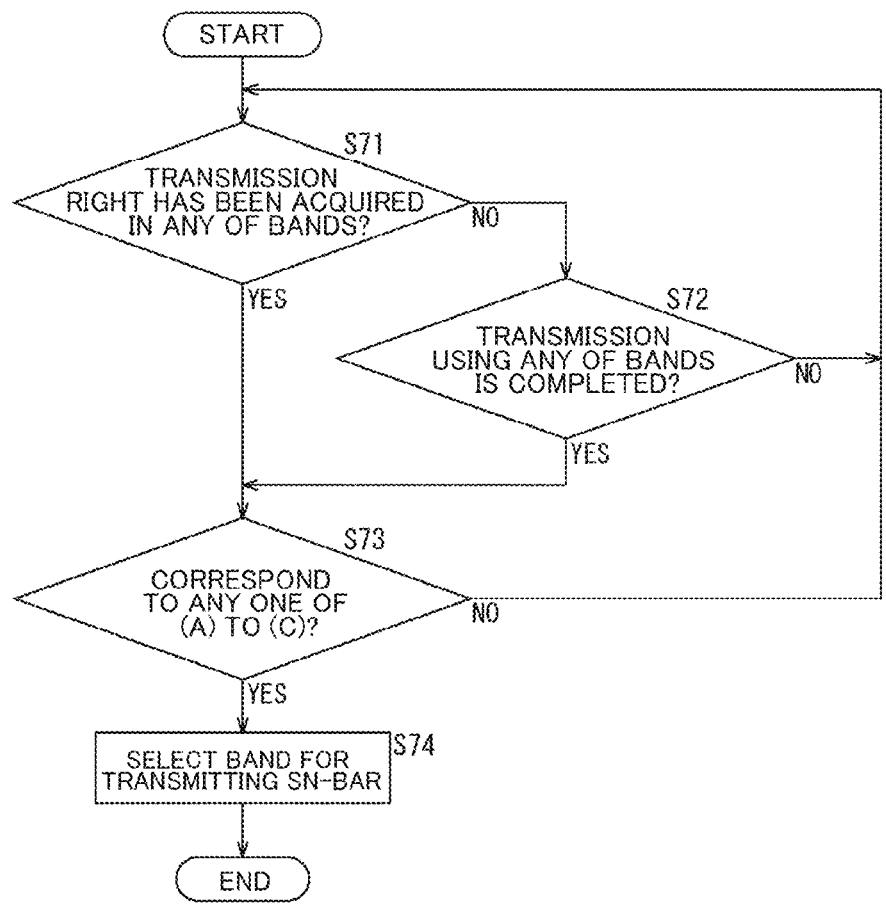
FIG. 14 is a flowchart illustrating a process of determining a band for transmitting an SN-BAR.

FIG. 14 is a flowchart illustrating a process of the AP determining a band for transmitting an SN-BAR.

The process of FIG. 14 is started by the transmission control unit 61 of the AP, for example, after the data is transmitted using the band for which the transmission right is first acquired.

In step S71, the transmission control unit 61 determines whether the transmission right has been acquired in any of the bands while transmission is being performed using a plurality of bands. For example, at time a2 or time a3, the transmission right is acquired on the basis of the execution result of CCA (Clear Channel Assessment). If it is determined that the transmission right has been acquired in any of the bands, the process proceeds to step S73.

On the other hand, if it is determined in step S71 that the transmission right has not been acquired in any of the bands, the process proceeds to step S72.

In step S72, the transmission control unit 61 determines whether the transmission using any of the bands is completed while the transmission using the plurality of bands is being performed.

For example, in any of the times a4 to a6, it is determined in step S72 that the transmission using any of the bands is completed, and the process proceeds to step S73.

If it is determined in step S71 that the transmission right has been newly acquired in the second band, the process proceeds to step S73.

In step S73, the transmission control unit 61 determines whether any of the followings conditions (A) to (C) is applicable.

(A) There is no band for which the transmission right can be acquired before the completion of transmission of all packets being transmitted currently.

(B) The total packet length (packet time length) of packets transmitted since the start of transmission of a plurality of bands is larger than a preset threshold of the total transmission time in a plurality of bands, the total elapsed time of transmission is larger than a preset elapsed time threshold, or the number of acquisition times of communication opportunities during transmission of a plurality of bands is larger than a preset threshold number of acquisition times of communication opportunities.

(C) The amount of data to be transmitted in a transmission queue is equal to or less than a preset threshold (including 0).

The total packet length in (B) is the sum of total packet lengths transmitted in a plurality of bands, or the total packet length from the start of the packet whose transmission started to the end of the packet whose transmission has completed (from time a1 to time a6).

If it is determined in step S73 that none of (A) to (C) is applicable, the process returns to step S71, and the subsequent processing is repeated. Even if it is determined in step S72 that the transmission using any band has not been completed, the process returns to step S71 and the subsequent processing is repeated.

If it is determined in step S73 that any of the conditions (A) to (C) is applicable, the process proceeds to step S74.

Here, when (A) is applicable, it corresponds to a case where the transmission right cannot be acquired in any band other than the band in which transmission is being performed currently. When (B) is applicable, it corresponds to a case where a preset transmission time threshold is exceeded. When (C) is applicable, it corresponds to a case where there is no data to be transmitted.

In step S74, the transmission control unit 61 selects a band for transmitting the SN-BAR. The transmission control unit 61 selects the band having the latest packet transmission completion time among the bands in which packets are currently being transmitted as the band for transmitting the SN-BAR. After the band is selected, the process of determining the band for transmitting the SN-BAR is completed.

According to the above conditions (A) to (C), the transmission determination of the SN-BAR can be executed at the timing when the transmission using the plurality of bands is completed. As described above, the transmission control unit 61 selects the band for transmitting the SN-BAR and transmits the SN-BAR when the transmission in the selected band is completed.

<Other Examples of Sequences During Data Transmission>

Figure 15:
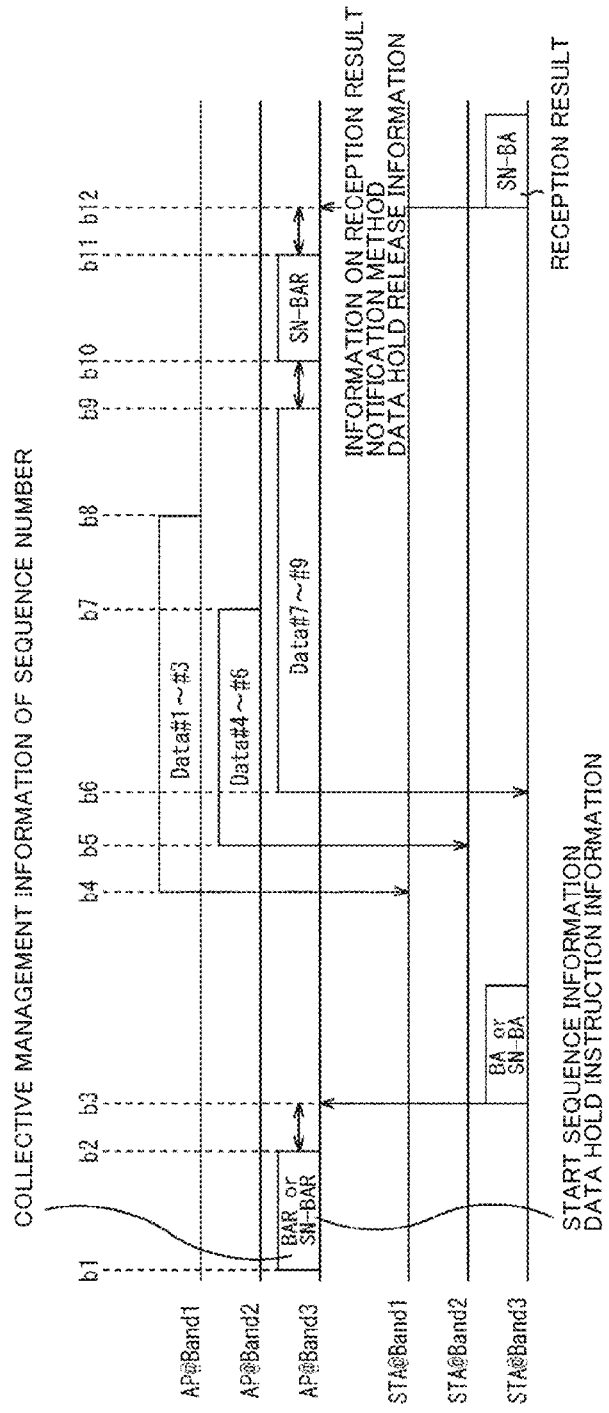
FIG. 15 is a diagram showing another example of a sequence during data transmission of the wireless communication system of FIG. 7.

FIG. 15 is a diagram showing another example of the sequence during data transmission of the wireless communication system of FIG. 7.

In FIG. 15, a modified example of the case of FIG. 13 is shown. In the case of FIG. 15, an example is shown in which the collective management information of the sequence number added to the Data signal and the start sequence information or the Data hold instruction information are transmitted in a state of being added to the SN-BAR of the previous communication.

When the previous communication is communication according to a conventional communication method, the collective management information of the sequence number and the start sequence information or the Data hold instruction information may be added to the BAR instead of the SN-BAR. The BAR is a signal that requests the reception result of data used in communication according to a conventional communication method.

Prior to time b1, the AP starts transmitting signals using the first band to the third band, respectively, as in the case of FIG. 13, and transmission using each band is completed in the order of the second band, the first band, and the third band.

At time b1 after the signal transmission using the third band is completed, the AP transmits the BAR or SN-BAR using the third band. In the case of the example of FIG. 15, the collective management information of the sequence number in the next communication and the start sequence information or the Data holding instruction information are added to the BAR or the SN-BAR. In the case of SN-BAR, information on the reception result notification method and, if necessary, the Data hold release information are added.

After time b2 when the transmission of the SN-BAR is completed, the AP waits until the SN-BAR is received in the third band.

The STA that has received the SN-BAR transmits a reception result (BA or SN_BA) on the basis of the notification method specified by the SN-BAR at time b3 after SIFS has elapsed from time b2 when the reception of the SN-BAR is completed.

After the reception of BA or SN-BA using the third band is completed, the AP starts the next communication at time b4. That is, at time b4, the AP acquires the transmission right in the first band and starts transmitting the signal of Data #1 to #3 using the first band. At time b5, the AP acquires the transmission right in the second band and starts transmitting the signal of Data #4 to #6 using the second band.

In the case of FIG. 15, the collective management information of the sequence number and the start sequence information or the Data holding instruction information are not added to the signal including these pieces of Data.

At time b7, the AP completes the transmission of the signal of Data #4 to #6 using the second band. At time b7, the STA completes the reception of the signal of Data #4 to #6 using the second band.

At time b8, the AP completes the transmission of the signal of Data #1 to #3 using the first band. At time b8, the STA completes the reception of the signal of Data #1 to #3 using the first band.

At time b9, the AP completes the transmission of the signal of Data #7 to #9 using the third band. At time b9, the STA completes the reception of the signal of Data #7 to #9 using the third band.

The AP transmits the SN-BAR at time a12 after SIFS has elapsed from the time when the transmission of the signal transmitted using a specific band (the third band in the case of FIG. 15) is completed.

The SN-BAR contains information on the reception result notification method and information requesting the release of Data hold as necessary. The collective management information of the sequence number in the next communication and the start sequence information, or the Data hold instruction information are also added.

After time b11 when the transmission of the SN-BAR is completed, the AP waits until the SN-BA is received in the third band. The STA that has received the SN-BAR transmits SN_BA on the basis of the notification method specified by the SN-BAR at time b12 after SIFS has elapsed from time b11 when the reception of the SN-BAR is completed.

<Format Configuration Example Used for Data Signal>

Figure 16:
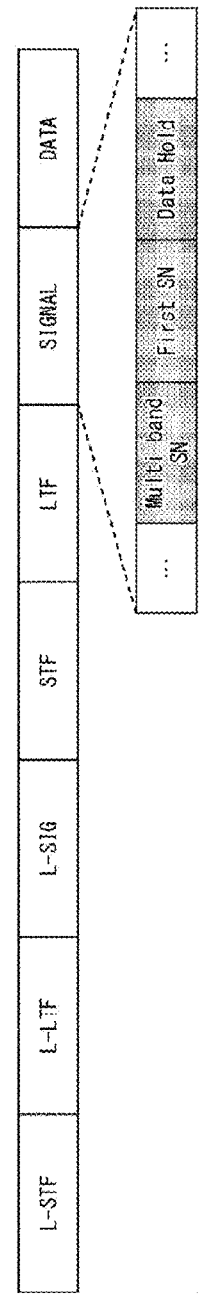
FIG. 16 is a diagram showing a format configuration example used for a Data signal.

FIG. 16 is a diagram showing a format configuration example used for a Data signal in the sequence during data transmission of FIG. 13.

FIG. 16 shows an example in which information is stored in a physical header.

The Data signal is configured of a physical header (Phy Header) arranged at the start and DATA.

The Phy Header may include L-STF (Legacy Short Training Field), L-LTF (Legacy Long Training Field), L-SIG (Legacy Signal Field), STF, LTF, and SIGNAL.

Multi-band SN, First SN, and Data Hold are stored in SIGNAL as information.

Multi-band SN is the collective management information of sequence numbers. The Multi-band SN may include information indicating the period during which transmission of a plurality of bands is planned.

First SN is the start sequence information.

Data Hold is hold request information of received data and reception result.

Figure 17:
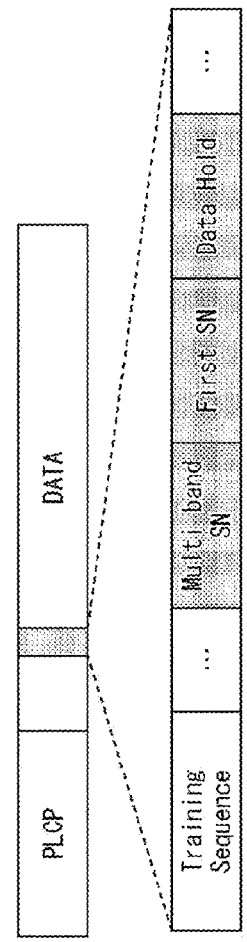
FIG. 17 is a diagram showing another format configuration example used for a Data signal.

FIG. 17 is a diagram showing another format configuration example used for the Data signal.

FIG. 17 shows an example in which information is stored in the middle of DATA following the physical header (PLCP).

The Data signal is configured of a physical header (PLCP) arranged at the start and DATA. A known signal added for synchronization is arranged in the middle of DATA. The information is stored after the known signal.

In the known signal, the same Multi-band SN, First SN, and Data Hold as in the case of FIG. 15 are stored as information.

<Format Configuration Example of SN-BAR Frame>

Figure 18:
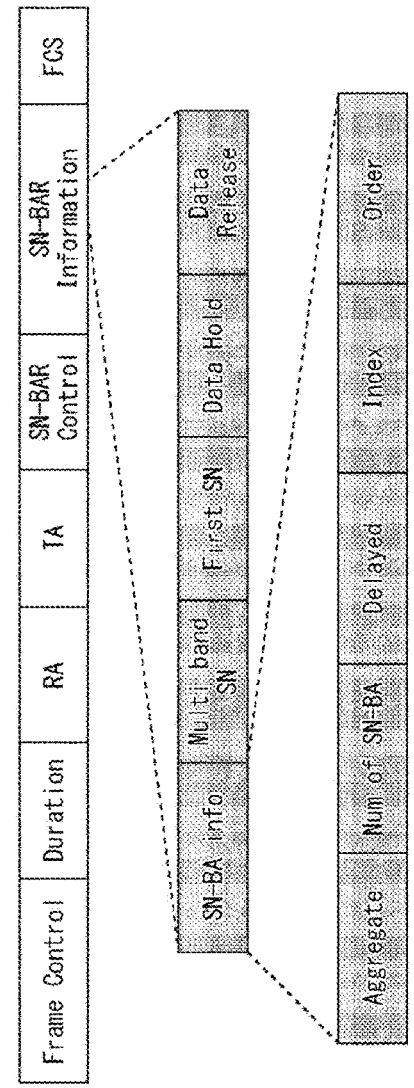
FIG. 18 is a diagram showing a format configuration example of an SN-BAR frame.

FIG. 18 is a diagram showing a format configuration example of the SN-BAR frame in the sequence during data transmission of FIGS. 13 and 15.

The frame of FIG. 18 is configured of Frame Control, Duration, RA, TA, SN-BA Control, SN-BA Information, and FCS fields. This frame is included in the MPDU (MAC Protocol Data Unit), which is a data unit in the MAC layer.

The SN-BA Information field stores SN-BA info, Multi-band SN, First SN, Data Hold, and Data Release.

SN-BA info is information on the reception result notification method. For example, the reception result (bitmap) for a plurality of bands may be aggregated and transmitted, may be transmitted as separate SN-BAs, or may be transmitted by a combination of these two methods.

SN-BA info is configured of Aggregate, Num.of SN-BA, Delayed, Index, and Order.

Aggregate is information indicating whether bitmaps are concatenated.

Num.of SN-BA is information indicating the number of SN-BAs to be transmitted as a reply.

Delayed is information indicating whether there is an SN-BA transmitted in another band at the transmission opportunity for which the transmission right has been acquired.

Index is information on the specified reception result.

Order is information on the order of arrangement.

Multiband SN is the collective management information of sequence numbers. First SN is the start sequence information. Data Hold is hold request information of received data and reception result. The Multiband SN, First SN, and Data Hold are added to the SN-BAR of the previous communication in the modified example of FIG. 15.

Data Release is Data hold release information. Data Release is added when Data Hold is transmitted.

<Format Configuration Example of SN-BA Frame>

Figure 19:
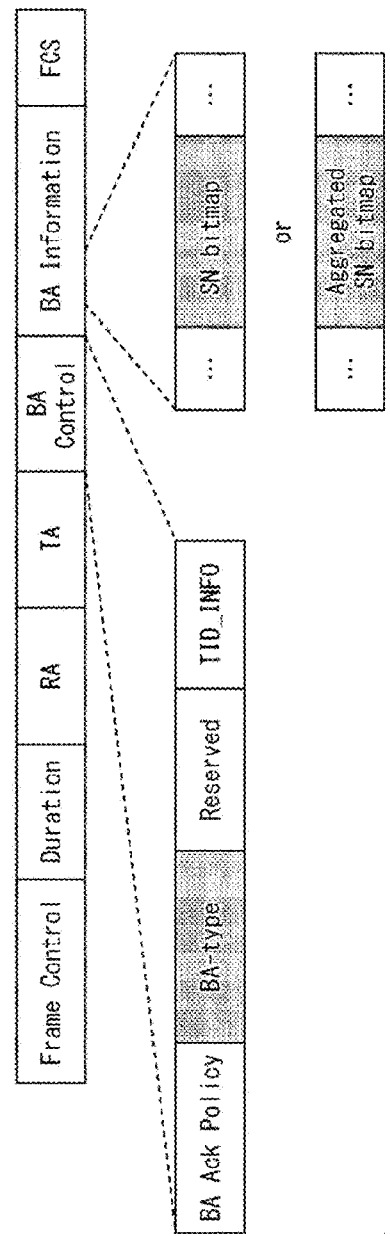
FIG. 19 is a diagram showing a format configuration example of an SN-BA frame.

FIG. 19 is a diagram showing a format configuration example of the SN-BA frame.

The frame of FIG. 19 is configured of Frame Control, Duration, RA, TA, BA Control, BA Information, and FCS fields.

The SN-BA Control field consists of BA Ack Policy, BA Type, Reserved, and TID_INFO fields.

In the SN-BA frame of FIG. 19, it is shown that the type of BA is SN-BA of the present technology using BA Type=4, which has been reserved in the past.

The SN bitmap is stored in the BA Information field. The SN bitmap is information indicating how the reception result corresponding to the SN specified by SN-BAR is stored. The SN bitmap is a part that shows the reception result of the SN corresponding to the Index of the SN-BAR.

When it is instructed to transmit reception results by concatenating the same with SN-BAR, Aggregated SN bitmap in which a plurality of SN bitmaps are concatenated is stored instead of SN bitmap.

<Example of Transmission and Reception of SN-BA>

Figure 20:
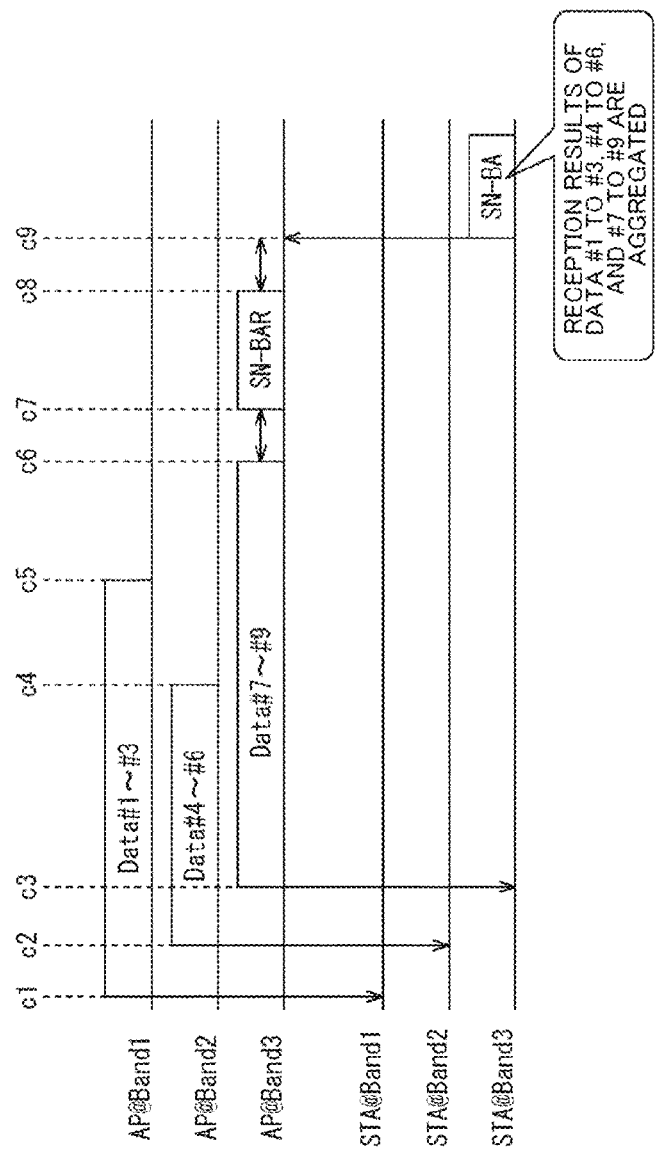
FIG. 20 is a diagram showing an example of transmission and reception of SN-BA specified by SN-BAR.

FIG. 20 is a diagram showing an example of transmission and reception of SN-BA specified by SN-BAR.

In the example of FIG. 20, the SN-BA in the case where the reception results of a plurality of bands are concatenated and transmitted is shown.

Since times c1 to c6 in FIG. 20 are processed in the same manner as times a1 to a6 in FIG. 13, the description thereof will be omitted.

At time c7 after SIFS has elapsed from the time when the transmission of the signal transmitted using the third band is completed, the AP transmits the SN-BAR using the third band.

After time c8 when the transmission of the SN-BAR is completed, the AP waits until the SN-BA is received in the third band. The STA that has received the SN-BAR transmits the SN-BA on the basis of the notification method specified by the SN-BAR at time c9 after SIFS has elapsed from time c8 when the reception of the SN-BAR is completed. The AP receives the SN-BA in the third band at time c9.

The SN-BA of FIG. 20 is an SN-BA in which the reception results of Data #1 to #3, Data #4 to #6, and Data #7 to #9 are concatenated. In the case of FIG. 20, all the reception results are collectively transmitted, which is efficient.

Figure 21:
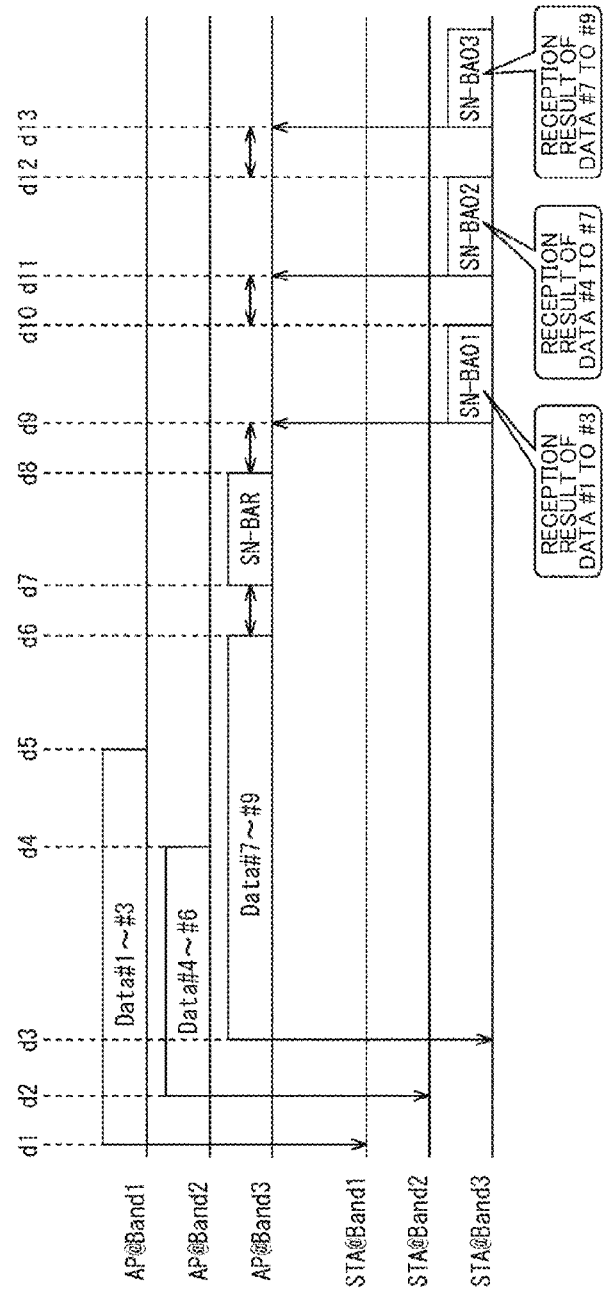
FIG. 21 is a diagram showing an example of other transmission and reception of SN-BA specified by SN-BAR.

FIG. 21 is a diagram showing another example of transmission and reception of SN-BA specified by SN-BAR.

In the example of FIG. 21, the SN-BA in the case where the reception results of a plurality of bands are individually transmitted is shown.

Since times d1 to d6 in FIG. 21 are processed in the same manner as times a1 to a6 in FIG. 13, the description thereof will be omitted.

At time d7 after SIFS has elapsed from the time when the transmission of the signal transmitted using the third band is completed, the AP transmits the SN-BAR using the third band.

After time d8 when the transmission of the SN-BAR is completed, the AP waits until the SN-BA01 to SN-BA03 are received in the third band. The STA that has received the SN-BAR transmits SN-BA01 consisting of the reception results of Data #1 to #3 using the third band on the basis of the notification method specified by the SN-BAR at time d9 after SIFS has elapsed from time d8 when the reception of the SN-BAR is completed. The AP receives SN-BA01 in the third band at time d9.

The STA transmits SN-BA02 consisting of the reception results of Data #4 to #6 using the third band on the basis of the notification method specified by SN-BAR at time d11 after SIFS has elapsed from time d10 when the transmission of SN-BA01 is completed. The AP receives SN-BA02 in the third band at time d11.

The STA transmits SN-BA03 consisting of the reception results of Data #7 to #9 using the third band on the basis of the notification method specified by SN-BAR at time d13 after SIFS has elapsed from time d12 when the transmission of SN-BA02 is completed. The AP receives SN-BA03 in the third band at time d13.

As described above, in the case of FIG. 21, the SN-BA01 to SN-BA03 are transmitted to the AP at equal intervals according to a preset time interval (SIFS). In the case of FIG. 21, it is compatible with the conventional BA.

Figure 22:
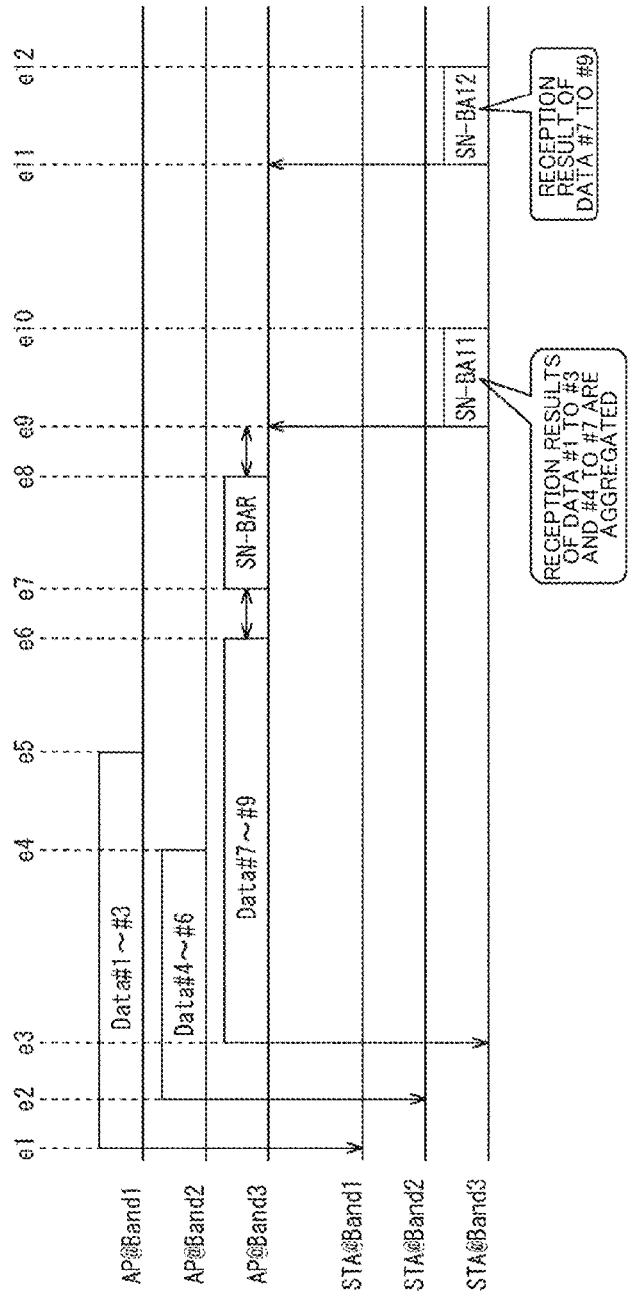
FIG. 22 is a diagram showing still another example of transmission and reception of SN-BA specified by SN-BAR.

FIG. 22 is a diagram showing still another example of transmission and reception of SN-BA specified by SN-BAR.

In the example of FIG. 22, the SN-BA when the reception result of any one of the reception results of the plurality of bands is transmitted at another transmission opportunity for which the transmission right has been acquired is shown.

Since times e1 to e6 in FIG. 22 are processed in the same manner as times a1 to a6 in FIG. 13, the description thereof will be omitted.

At time e7 after SIFS has elapsed from the time when the transmission of the signal transmitted using the third band is completed, the AP transmits the SN-BAR using the third band.

After time e8 when the transmission of the SN-BAR is completed, the AP waits until the SN-BA is received in the third band. The STA that has received the SN-BAR transmits SN-BA11 using the third band on the basis of the notification method specified by the SN-BAR at time e9 after SIFS has elapsed from time e8 when the reception of the SN-BAR is completed. The AP receives the SN-BA11 in the third band at time e9.

SN-BA11 is an SN-BA in which the reception results of Data #1 to #3 and Data #4 to #6 are concatenated.

After time e10 when the transmission of the SN-BA11 is completed, the STA acquires another transmission right at time e11 and transmits SN-BA12 consisting of the reception results of Data #7 to #9 using the third band on the basis of the notification method specified by the SN-BAR. The AP receives the SN-BA12 in the third band at time e11.

As described above, in the case of FIG. 22, the SN-BA12 is transmitted to the AP at a transmission opportunity different from that of the SN-BA11. In this case, since the transmission can be performed while grasping the communication efficiency, the reception result can be reliably transmitted.

Since the reception result of the MPDU is transmitted using a specific band, the AP and STA can realize data transmission in a plurality of bands by the processing in one MAC layer as before. In addition, retransmission can be performed in the correct sequence number order.

4. Second Embodiment

Next, as a second embodiment, a case where information requesting a reception result corresponding to a sequence number of data collectively managed in a plurality of bands is included in a signal for transmitting data will be described. Similarly to the first embodiment, the sequence number management is performed, for example, in the MAC layer, but may be performed in a layer higher than the MAC layer. The description of the same processing as that of the first embodiment is omitted. The process during association in the second embodiment is the same process as in the first embodiment.

<Example of Sequence During Data Transmission>

Figure 23:
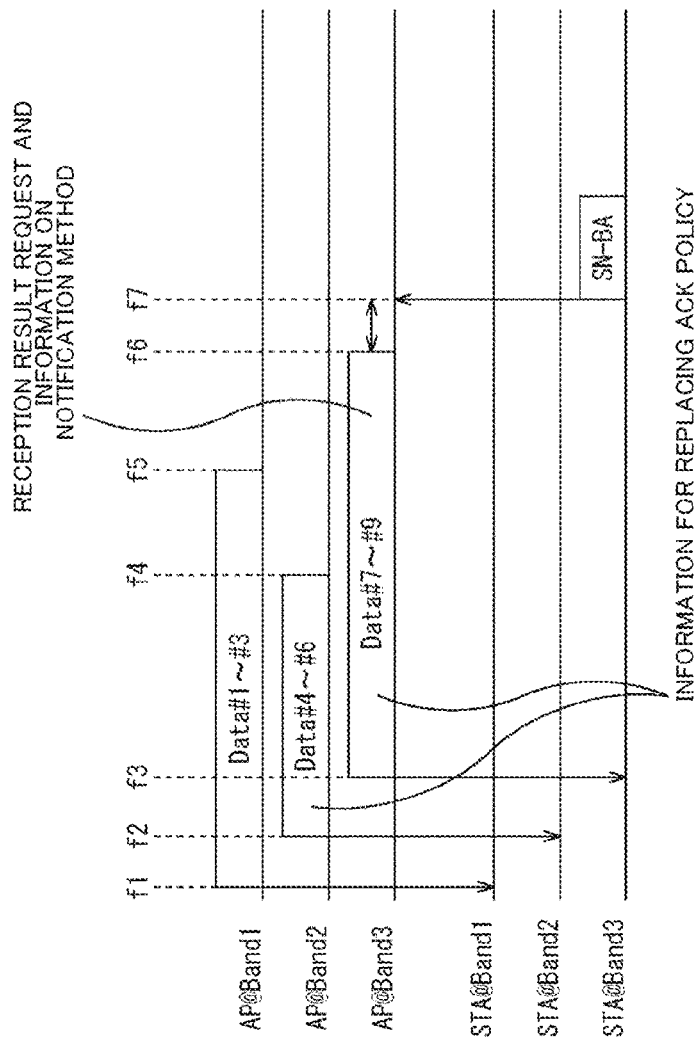
FIG. 23 is a diagram showing another example of a sequence during data transmission of the wireless communication system of FIG. 7.

FIG. 23 is a diagram showing another example of the sequence during data transmission of the wireless communication system of FIG. 7.

The data transmission in FIG. 23 is a process performed after the above-mentioned association. The double-headed arrow in FIG. 23 represents the minimum time interval (SIFS) time when transmitting BAR or BA.

In FIG. 23, the information requesting the reception result corresponding to the sequence number of the data collectively managed in a plurality of bands is included in the signal for transmitting the data. Therefore, it is necessary to acquire the transmission right and determine what kind of information is to be added at the time of transmitting a packet.

Therefore, in the information included in the signal for transmitting data, the information for replacing the ACK policy, the reception result request, and the information on the reception result notification method are increased as compared with the case of transmitting the SN-BAR of FIG. 13.

The information for replacing the ACK policy is one of the information on the management method, and is the information for replacing the ACK policy of the packet whose reception started earlier with No ACK when transmission is performed using a plurality of bands. Replacing with No ACK means that the STA does not return ACK.

The intention of replacing the ACK is to return the ACK in the band where the transmission was last completed in the plurality of bands, so that the ACK is not returned in the band set during transmission in a single band. That is, even if the ACK policy is replaced with No ACK by the information for replacing the ACK policy, the ACK of all the data is finally returned by the notification method indicated by the information on the reception result notification method. Therefore, the information to be replaced may not be No ACK, but may be information requesting that an ACK be returned in the band in which transmission is finally completed in a plurality of bands. The other information is the same as the information described in the first embodiment.

At time f1, the AP acquires the transmission right in the first band and starts transmitting the signal of Data #1 to #3 using the first band. The AP adds the collective management information of the sequence numbers to the signal of Data #1 to #3 and transmits the same. When the transmission right is first acquired, since it has not yet been decided to perform transmission using a plurality of bands, the ACK Policy during transmission using a single band is set.

At time f2, the AP acquires the transmission right in the second band and starts transmitting the signal of Data #4 to #6 using the second band. The AP transmits the signal of Data #4 to #6 with the collective management information of the sequence numbers, the information for replacing the ACK policy, the reception result request, and the information on the reception result notification method added thereto.

Here, the information on the reception result notification method includes information for specifying the band for transmitting the SN-BA. For example, at time f2, since the transmission using Band3 has not been performed, Band1 is specified in the information for specifying the band for transmitting SN-BA.

At time f3, the AP acquires the transmission right in the third band and starts transmitting the signal of Data #7 to #9 using the third band. The AP transmits the signal of Data #7 to #9 with the collective management information of the sequence number, the information for replacing the ACK policy, the reception result request, and the information on the reception result notification method added thereto. At this time, Band3 is specified in the information for specifying the band for transmitting SN-BA.

At time f4, the AP completes the transmission of the signal of Data #4 to #6 using the second band. At time f4, the STA completes the reception of the signal of Data #4 to #6 using the second band.

At time f5, the AP completes the transmission of the signal of Data #1 to #3 using the first band. At time f5, the STA completes the reception of the signal of Data #1 to #3 using the first band.

At time f6, the AP completes the transmission of the signal of Data #7 to #9 using the third band. At time f6, STA completes the reception of the signal of Data #7 to #9 using the third band.

Here, the signal of Data #4 to #6 and the signal of Data #7 to #9 in FIG. 23 are transmitted with information for replacing the ACK Policy added thereto. Therefore, the STA replaces the ACK Policy of the previously received packets of Data #1 to #6 with No ACK on the basis of the information for replacing the ACK policy.

Band3 is specified in the information that specifies the band for transmitting SN-BA, which is added to the signal of Data #7 to #9 whose transmission is completed last. The STA transmits the reception result (SN_BA) on the basis of the specified notification method using the third band at time f7 after SIFS has elapsed from the time when the signal of Data #7 to #9 is received.

In order to do so, the AP needs to determine what kind of information is to be added at the time when the transmission right is acquired, as will be described later.

<AP Operation>

Figure 24:
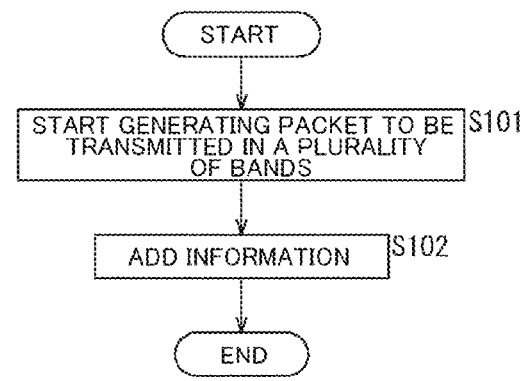
FIG. 24 is a flowchart illustrating a process of determining a band for transmitting SN-BA.

FIG. 24 is a flowchart illustrating a process of determining a band for transmitting SN-BA.

The process of FIG. 24 is, for example, a process that starts when a new transmission right is acquired in any one of a plurality of bands while transmission is being performed using the plurality of bands after data is transmitted using a band for which a transmission right was first acquired. For example, since it has not yet been decided to transmit data using a plurality of bands, an ACK Policy during transmission in a single band is set in the signal for transmitting data, for which the transmission right is first acquired.

In step S101, the transmission control unit 61 of the AP starts generating packets to be transmitted in a plurality of bands.

In step S102, the transmission control unit 61 of the AP adds the information described below to the generated packet. After that, the process is completed.

The information added to the packet is any combination of the followings.

Collective management information of sequence numbers
Information for replacing ACK policy
Start sequence information or reception result hold request information
Reception result request and information on notification method The information on the notification method includes information for specifying the band for transmitting the SN-BA.

When the reception result request and the information on the notification method are transmitted a plurality of times, only the difference information may be transmitted.

Although there is a branch in the flowchart of FIG. 14 described above, the branch does not occur in the case of FIG. 24 unlike FIG. 14. This is because even if there is a band in which the transmission right can be acquired next, transmission may not be possible due to CSMA-CA (Carrier Sense Multiple Access with Collision Avoidance).

Therefore, when transmission is performed using a plurality of bands, the AP always needs the reception result request and the information on the notification. On the other hand, the STA updates with new information each time it receives the reception result request and the information on the notification method.

<Example of Sequence During Data Transmission>

Figure 25:
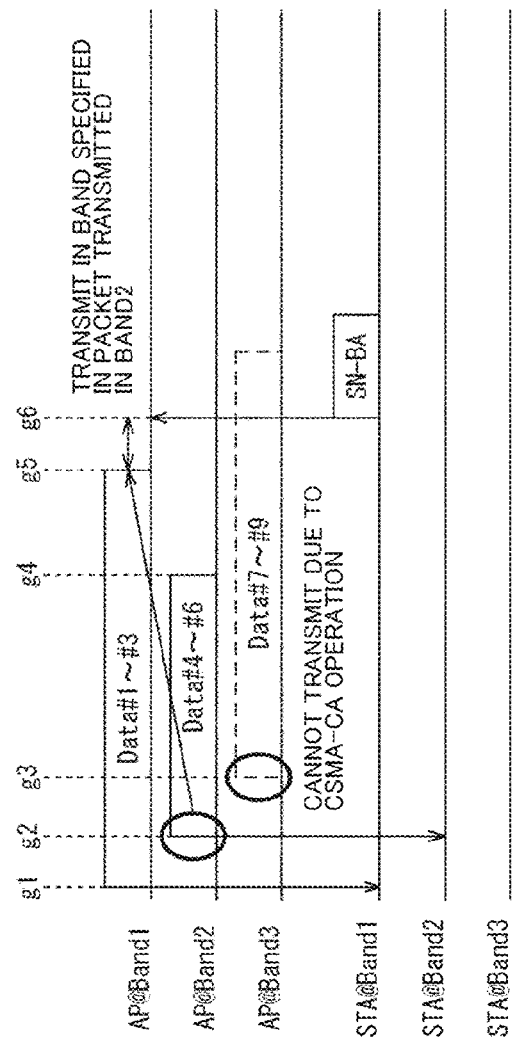
FIG. 25 is a diagram showing another example of the sequence of FIG. 23.

FIG. 25 is a diagram showing another example of the sequence of FIG. 23.

FIG. 25 shows a sequence in which the band for returning SN-BA changes due to waiting for transmission due to CSMA-CA.

At time g1, the AP acquires the transmission right in the first band and starts transmitting the signal of Data #1 to #3 using the first band. The AP transmits the signal of Data #1 to #3 with the collective management information of the sequence number added thereto.

At time g2, the AP acquires the transmission right in the second band and starts transmitting the signal of Data #4 to #6 using the second band. The AP transmits the signal of Data #4 to #6 with information on the collective management information of the sequence number, the information for replacing the ACK policy, the reception result request, and the information on the reception result notification method added thereto.

Here, the information on the reception result notification method includes information for specifying the band for transmitting the SN-BA. For example, at time g2, since the transmission using Band3 has not been performed yet, Band1 is specified in the information for specifying the band for transmitting SN-BA.

At time g3, the AP acquires the transmission right using the third band, but is not transmitted due to CSMA-CA.

At time g4, the AP completes the transmission of the signal of Data #4 to #6 using the second band. At time g4, the STA completes the reception of the signal of Data #4 to #6 using the second band.

At time g5, the AP completes the transmission of the signal of Data #1 to #3 using the first band. At time g5, the STA completes the reception of the signal of Data #1 to #3 using the first band.

Here, for example, since it has not yet been decided to transmit data using a plurality of bands, an ACK Policy during transmission in a single band is set in the signal for transmitting data, for which the transmission right is first acquired. Therefore, the ACK Policy of the signal of Data #1 to #3 is rewritten with the information for replacing the ACK policy added to the signal of Data #4 to #6. In addition, Band1 is specified in the information added to the signal of Data #4 to #6 that specifies the band for transmitting SN-BA. Therefore, the AP waits for the reception result (SN_BA) on the basis of the specified notification method using the first band. The STA transmits the reception result (SN_BA) on the basis of the specified notification method using the first band at time g6 after SIFS has elapsed from the time when the signal of Data #1 to #3 is received.

<Format Configuration Example Used for Data Signal>

Figure 26:
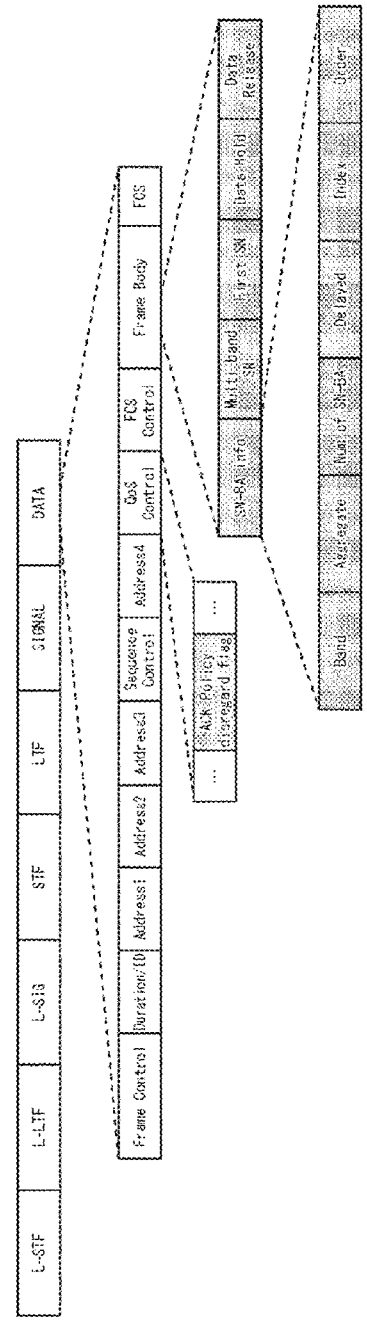
FIG. 26 is a diagram showing a format configuration example used for a Data signal.

FIG. 26 is a diagram showing a format configuration example used for a Data signal.

FIG. 26 shows an example in which information is stored in a Mac frame (DATA). The description of the same parts as those in the first embodiment will be omitted. The same applies to the following drawings.

Like the Data signal of FIG. 11, the Data signal is configured of a Phy Header arranged at the start and DATA.

Data includes Frame Control, Duration/ID, Address1, Address2, Address3, Sequence Control, Address4, QoS Control, FCS Control, Frame Body, and FCS, as in the case of the Data signal of FIG. 11.

In the QoS Control of FIG. 26, an ACK policy disregard flag, which is information for replacing the ACK policy, is stored. The ACK policy disregard flag may be 1-bit information such as a flag, or information that specifically indicates another band in which a packet to be read as No ACK is present.

The Frame Body also stores the SN-BA Info, Multi band SN, First SN, Data Hold, and Data Release similarly to the SN-BA Information field of the SN-BAR frame of FIG. 18.

Band is added to SN-BA Info as compared with SN-BA info in the SN-BAR frame of FIG. 18.

In Band, information for specifying the band for transmitting SN-BA is stored as information on the reception result notification method.

Figure 27:
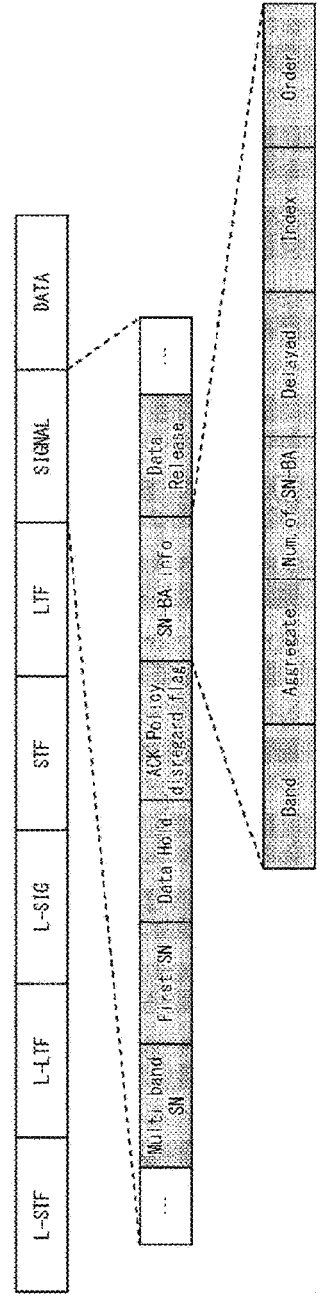
FIG. 27 is a diagram showing another format configuration example used for a Data signal.

FIG. 27 is a diagram showing another format configuration example used for the Data signal.

FIG. 27 shows an example in which information is stored in the physical header.

In the SIGNAL, Multi-band SN, First SN, Data Hold, ACK policy disregard flag which is information for replacing ACK policy, SN-BA Info, and Data Release are stored as information. The SN-BA Info contains the same information as the SN-BA info of FIG. 26.

Figure 28:
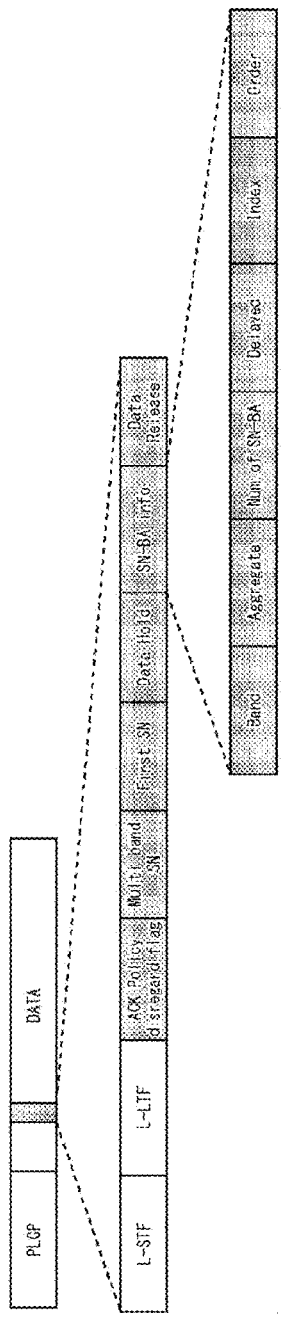
FIG. 28 is a diagram showing another format configuration example used for a Data signal.

FIG. 28 is a diagram showing another format configuration example used for the Data signal.

FIG. 28 shows an example in which information is stored in the middle of DATA following the physical header (PLCP).

The Data signal is configured of a physical header (PLCP) arranged at the start and DATA. A known signal added for synchronization is arranged in the middle of DATA. The information is stored after the known signal.

In the known signal, Multi-band SN, First SN, Data Hold, ACK policy disregard flag which is information for replacing ACK policy, SN-BA Info, and Data Release, as in the case of FIG. 27, are stored as information.

<Example of Sequence During Data Transmission>

Figure 29:
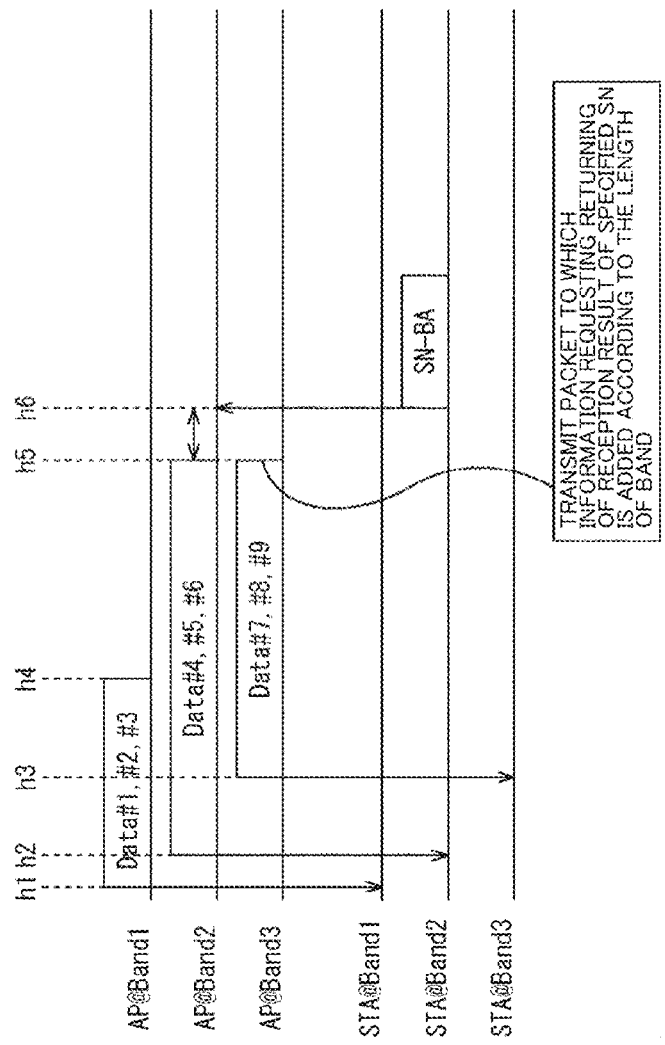
FIG. 29 is a diagram showing another example of the sequence of FIG. 23.

FIG. 29 is a diagram showing another example of the sequence of FIG. 23.

In FIG. 29, a sequence in which a signal to be transmitted in a subsequent band is determined according to a reception completion timing of a signal to which information requesting a reception result of a series of sequences is added when transmitting data in a plurality of bands is shown.

At time h1, the AP acquires the transmission right in the first band and starts transmitting the signal of Data #1 to #3 using the first band. The AP transmits the signal of Data #1 to #3 with the collective management information of the sequence number added thereto.

At time h2, the AP acquires the transmission right in the second band and starts transmitting the signal of Data #4 to #6 using the second band. The AP transmits the signal of Data #4 to #6 with information on the collective management information of the sequence number, the information for replacing the ACK policy, the reception result request, and the information on the reception result notification method added thereto. At this time, Band1 is specified in the information for specifying the band for transmitting the SN-BA included in the information on the reception result notification method.

At time h3, the AP acquires the transmission right using the third band and starts transmitting the signal of Data #7 to #9 using the third band. The AP transmits the signal of Data #7 to #9 with the collective management information of the sequence number added thereto. At this time, the signal length of Data #7 to #9 is determined according to the signal length of Data #4 to #6 requesting the reception result.

By doing so, the wireless communication system in the second embodiment can be operated according to the same manner as in the first embodiment. For example, the AP can determine the packet to which the information is added according to the determination in step S73 of FIG. 14. Then, when the AP acquires the transmission right after adding the packet, it can be specified to additionally transmit the reception result to the preset band. As a result, even in the wireless communication system according to the second embodiment, it is possible to perform an operation of transmitting the reception result of a series of sequences of data in the band in which the communication is finally completed.

The AP can additionally transmit data when the communication right is acquired in another band after the band for transmitting the ACK is determined.

At time h4, the AP completes the transmission of the signal of Data #1 to #3 using the first band. At time h4, the STA completes the reception of the signal of Data #1 to #3 using the first band.

At time h5, the AP completes the transmission of the signal of Data #4 to #6 using the second band and the transmission of the signal of Data #7 to #9 using the third band. At time h5, the STA completes the reception of the signal of Data #4 to #6 using the second band and the reception of the signal of Data #7 to #9 using the third band.

In the case of FIG. 29, Band1 is specified in the information for specifying the band for transmitting SN-BA, which is added to the signal of Data #4 to #6 requesting the reception result. The AP waits for the reception result (SN_BA) on the basis of the specified notification method using the second band. The STA transmits the reception result (SN_BA) using the second band on the basis of the specified notification method at time h6 after SIFS has elapsed from the time when the signal of Data #4 to #6 is received.

<Example of Transmission and Reception of SN-BA>

Figure 30:
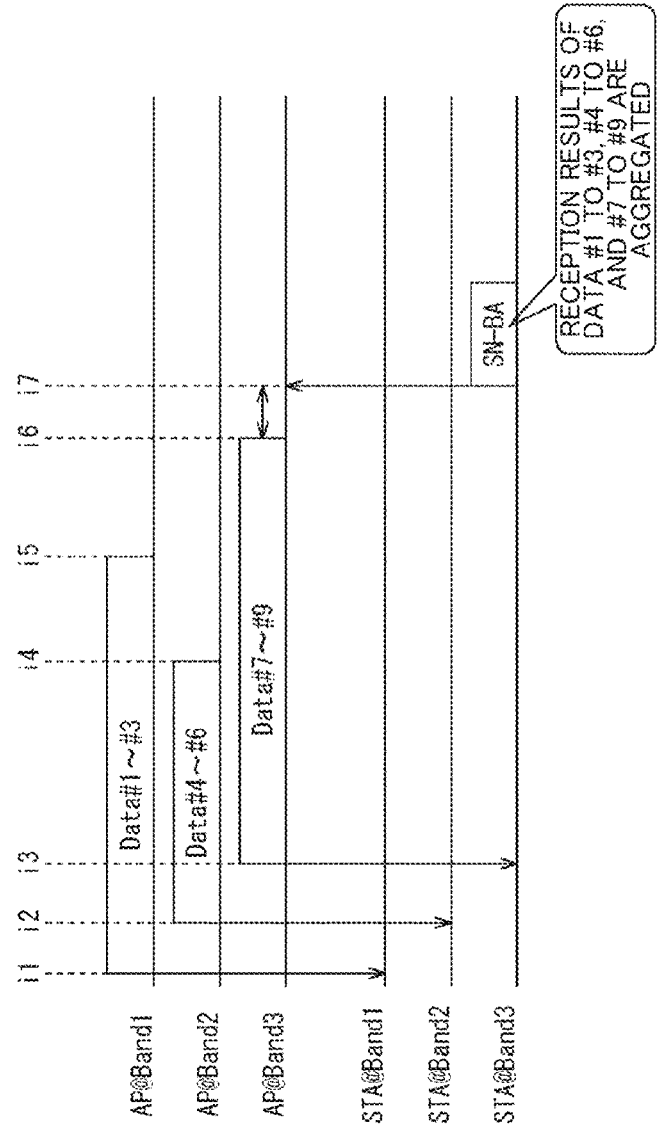
FIG. 30 is a diagram showing an example of an SN-BA transmitted on the basis of a specified notification method.

FIG. 30 is a diagram showing an example of SN-BA transmitted on the basis of the specified notification method.

In the example of FIG. 30, the SN-BA in the case where the reception results of a plurality of bands are concatenated and transmitted is shown.

Since times i1 to i6 in FIG. 30 are processed in the same manner as times f1 to f6 in FIG. 23, the description thereof will be omitted.

At time i6, the AP transmits the signal of Data #7 to #9 with information on the collective management information of the sequence number, the information for replacing the ACK policy, the reception result request, and the information on the reception result notification method added thereto. At this time, Band3 is specified in the information that specifies the band for transmitting SN-BA.

At time i7 after SIFS has elapsed from the time when the reception of the signal transmitted using the third band is completed, the STA transmits SN-BA on the basis of the specified notification method using the third band. The AP receives the SN-BA in the third band at time i7.

The SN-BA of FIG. 30 is an SN-BA in which the reception results of Data #1 to #3, Data #4 to #6, and Data #7 to #9 are concatenated. It is efficient because all the reception results are collectively transmitted.

Figure 31:
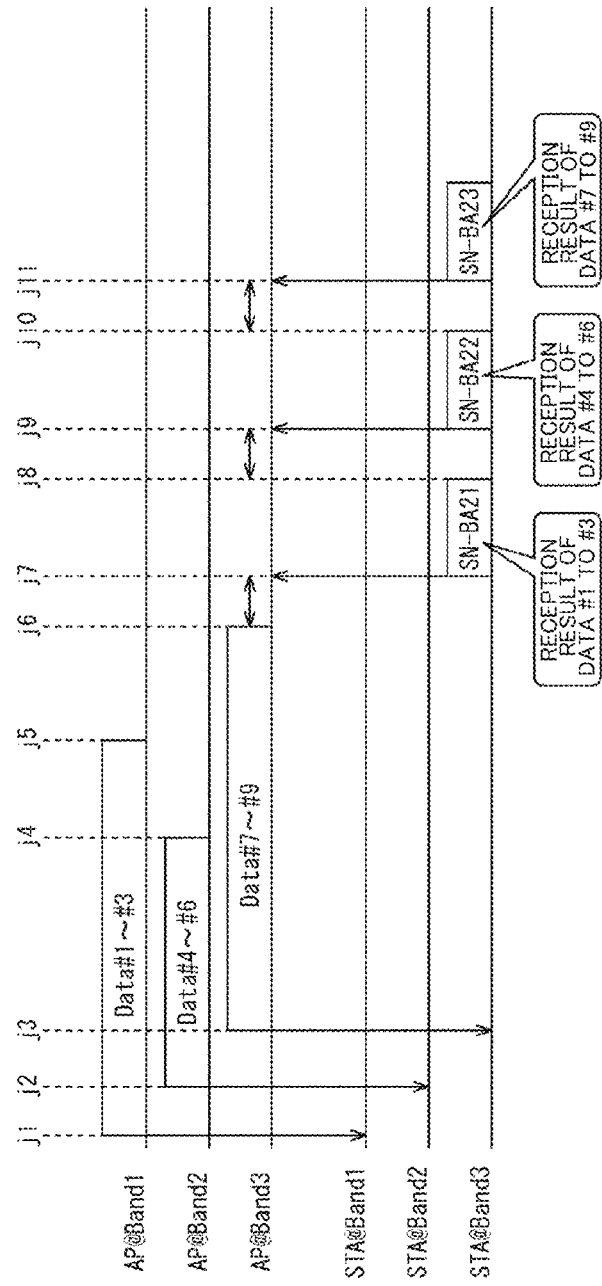
FIG. 31 is a diagram showing another example of a SN-BA transmitted on the basis of a specified notification method.

FIG. 31 is a diagram showing another example of the SN-BA transmitted on the basis of the specified notification method.

In the example of FIG. 31, the SN-BA in the case where the reception results of a plurality of bands are individually transmitted is shown.

Since times j1 to j6 in FIG. 31 are processed in the same manner as times f1 to f6 in FIG. 23, the description thereof will be omitted.

At time j6, the AP transmits the signal of Data #7 to #9 with information on the collective management information of the sequence number, the information for replacing the ACK policy, the reception result request, and the information on the reception result notification method added thereto. At this time, Band3 is specified in the information that specifies the band for transmitting SN-BA.

At time j7, after SIFS has elapsed from the time when the reception of the signal transmitted using the third band is completed, the STA transmits SN-BA21 consisting of the reception results of Data #1 to #3 using the third band on the basis of the specified notification method. The AP receives the SN-BA21 in the third band at time j7.

The STA transmits SN-BA22 consisting of the reception results of Data #4 to #6 using the third band on the basis of the specified notification method at time j9 after SIFS has elapsed from time j8 when the transmission of the SN-BA01 is completed. The AP receives the SN-BA22 in the third band at time j8.

The STA transmits SN-BA23 consisting of the reception results of Data #7 to #9 using the third band on the basis of the specified notification method at time j11 after SIFS has elapsed from time j10 when the transmission of SN-BA02 is completed. The AP receives the SN-BA23 in the third band at time j10.

As described above, in the case of FIG. 31, the SN-BA31 to SN-BA33 are transmitted to the AP at equal intervals by a preset time interval (SIFS). In the case of FIG. 31, it is compatible with the conventional BA.

Figure 32:
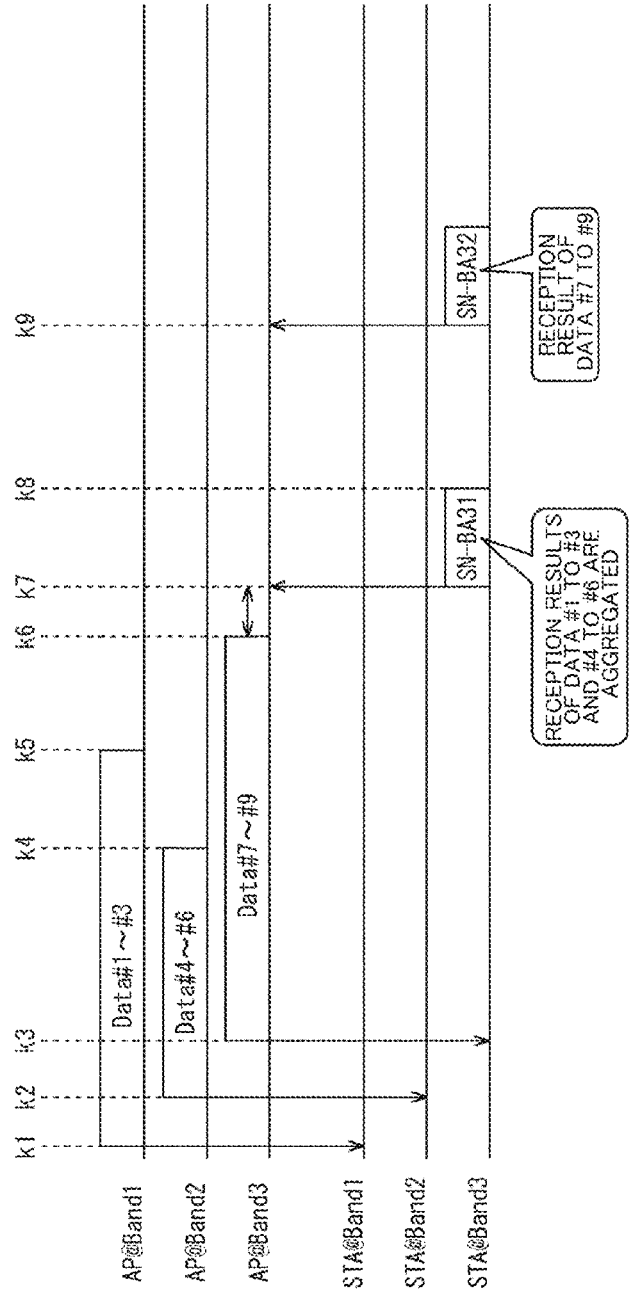
FIG. 32 is a diagram showing yet another example of an SN-BA transmitted on the basis of a specified notification method.

FIG. 32 is a diagram showing still another example of the SN-BA transmitted on the basis of the specified notification method.

In the example of FIG. 32, the SN-BA in the case where the reception result of any one of the reception results of a plurality of bands is transmitted at another transmission opportunity for which another transmission right has been acquired is shown.

Since times k1 to k6 in FIG. 32 are processed in the same manner as times f1 to f6 in FIG. 23, the description thereof will be omitted.

At time k6, the AP transmits the signal of Data #7 to #9 with information on the collective management information of the sequence number, the information for replacing the ACK policy, the reception result request, and the information on the reception result notification method added thereto. At this time, Band3 is specified in the information that specifies the band for transmitting SN-BA.

At time k7 after SIFS has elapsed from the time when the reception of the signal transmitted using the third band is completed, the STA transmits SN-BA31 consisting of the reception results of Data #1 to #3 using the third band on the basis of the specified notification method. The AP receives the SN-BA31 in the third band at time k7.

SN_BA41 is an SN-BA in which the reception results of Data #1 to #3 and Data #4 to #6 are concatenated.

The STA transmits SN-BA32 consisting of the reception result of Data #7 to #9 using the third band on the basis of the notification method specified by SN-BAR at time k9 after SIFS has elapsed from time k8 when the transmission of SN-BA31 is completed. The AP receives the SN-BA32 in the third band at time k9.

As described above, in the case of FIG. 32, the SN-BA32 is transmitted to the AP at a transmission opportunity different from that of the SN-BA31. In this case, since the transmission can be performed while grasping the communication efficiency, the reception result can be reliably transmitted.

Since the reception result of the MPDU is transmitted using a specific band, the AP and STA can realize data transmission in a plurality of bands by the processing in one MAC layer as before. In addition, retransmission can be performed in the correct sequence number order.

5. Others

<Capability Information Field>

Figure 33:
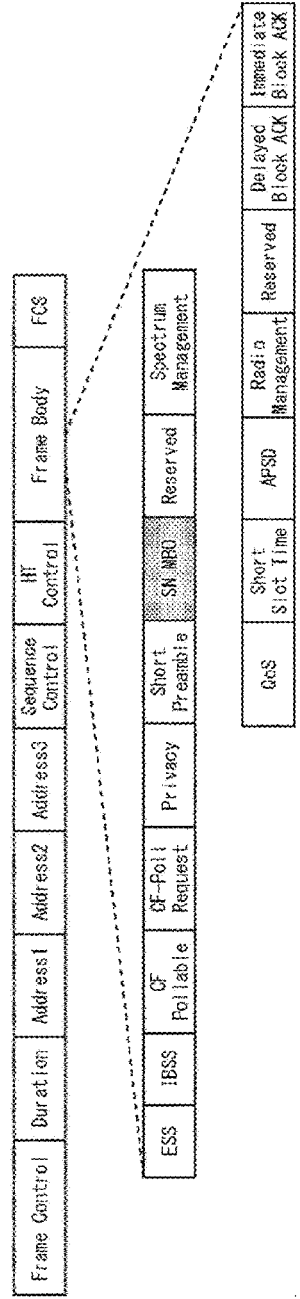
FIG. 33 is a diagram showing an example of a Capability Information field.

FIG. 33 is a diagram showing an example of the Capability Information field.

The Capability information on the information on the management method described above in the first and second embodiments may be included in the Capability Information field in the Management frame.

In FIG. 33, an example of the Capability Information field in the Management frame is shown.

The SN MBO field of the Frame body in the Management frame is one of the information on the reception result management method, and is the information asking whether the operation described in the first and second embodiments is performed. The SN MBO field may be 1-bit information such as a flag, or may be divided into a plurality of pieces of bit information for each function.

As described above with reference to the first and second embodiments, in the present technology, when the AP transmits data using a plurality of bands, the sequence number of the data (MPDU) is collectively managed, and information on the reception result notification method and the information on the management method are transmitted.

For example, the information on the management method is at least one of the collective management information of the sequence number, the hold request information of the reception result, the holdability information of the reception result, the start sequence information, the Data hold instruction information, the Data hold release information, the information for replacing ACK policy, and information asking whether the operation of the present technology is performed.

It is possible to prevent the data destruction that occurred when the sequence numbers are not collectively managed.

<Configuration Example of Computer>

The above-described series of processing can also be performed by hardware or software. When the series of processing is performed by software, a program for the software is embedded in dedicated hardware to be installed from a program recording medium to a computer or a general-purpose personal computer.

Figure 34:
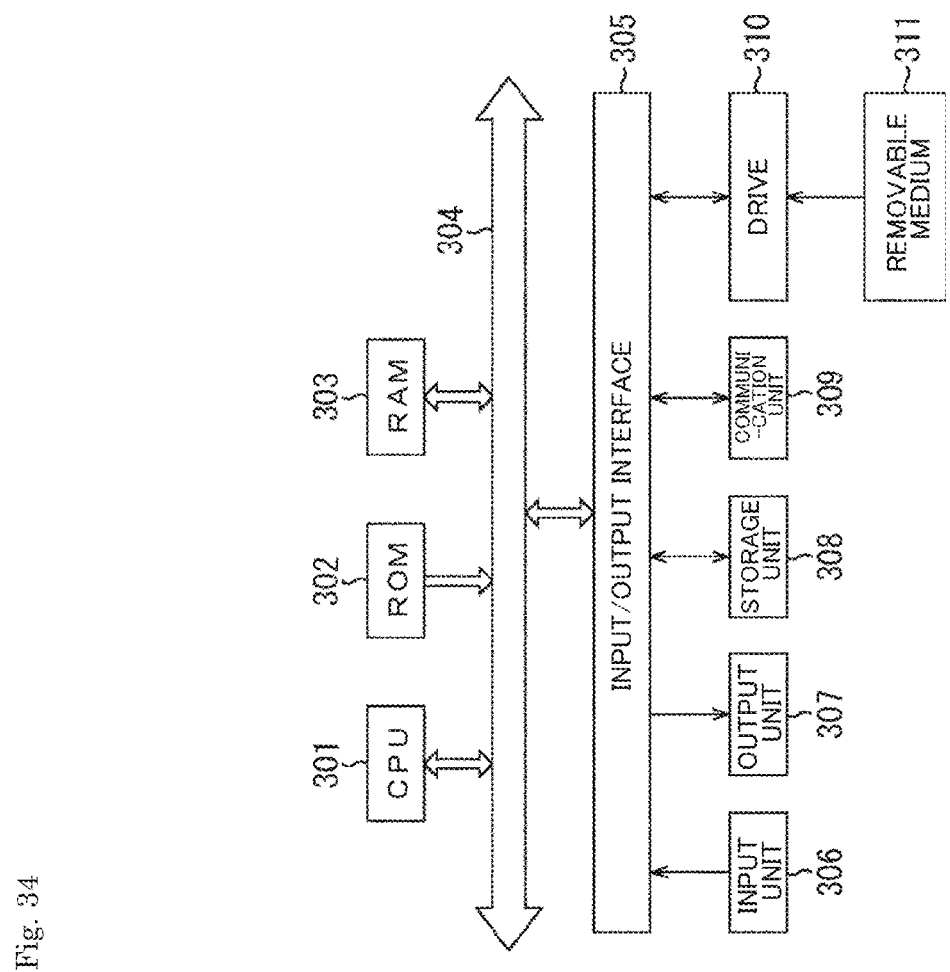
FIG. 34 is a block diagram showing a configuration example of a computer.

FIG. 34 is a block diagram illustrating a configuration example of hardware of a computer that executes a program to perform the above-described series of processing.

A central processing unit (CPU) 301, a read-only memory (ROM) 302, and a random access memory (RAM) 303 are connected to each other via a bus 304.

An input/output interface 305 is further connected to the bus 304. An input unit 306 including a keyboard and a mouse and an output unit 307 including a display and a speaker are connected to the input/output interface 305. A storage unit 308 including a hard disk or a nonvolatile memory, a communication unit 309 including a network interface, a drive 310 driving a removable medium 311 are connected to the input/output interface 305.

In the computer that has such a configuration, for example, the CPU 301 loads a program stored in the storage unit 308 to the RAM 303 via the input/output interface 305 and the bus 304 and executes the program to perform the above-described series of processing.

The program executed by the CPU 301 is recorded on, for example, the removable medium 311 or is provided via a wired or wireless transfer medium such as a local area network, the Internet, a digital broadcast to be installed in the storage unit 308.

The program executed by the computer may be a program that performs processes chronologically in the procedure described in the present specification or may be a program that performs a process at a necessary timing such as in parallel or upon being called.

In the present specification, a system is a collection of a plurality of constituent elements (devices, modules (components), or the like) and all the constituent elements may be located or not located in the same casing. Therefore, a plurality of devices housed in separate housings and connected via a network, and one device in which a plurality of modules are housed in one housing are both systems.

Also, the advantageous effects described in the present specification are merely exemplary and are not intended as limiting, and other advantageous effects may be obtained.

The embodiment of the present technology is not limited to the above-described embodiments, and various modifications can be made without departing from the gist of the present technology.

For example, the present technology can be configured as cloud computing in which one function is shared and processed in common by a plurality of devices via a network.

Further, the respective steps described in the above-described flowchart can be executed by one device or in a shared manner by a plurality of devices.

Furthermore, in a case where a plurality of kinds of processing are included in a single step, the plurality of kinds of processing included in the single step may be executed by one device or by a plurality of devices in a shared manner.

<Combination Examples of Configurations>

The present technology can be configured as follows.

(1) A wireless communication device including: a transmission control unit that collectively manages a sequence number of data transmitted using each band in communication using a plurality of bands and controls transmission of information on a notification method of a reception result of the data and information on a management method.

(2) The wireless communication device according to (1), wherein the transmission control unit controls transmission of information indicating that the sequence number of the data is collectively managed and transmitted as the information on the management method.

(3) The wireless communication device according to (1) or (2), wherein the transmission control unit controls transmission of information on the sequence number of the start data in the communication as the information on the management method.

(4) The wireless communication device according to (1) or (2), wherein the transmission control unit controls transmission of information for instructing to hold the data and information for releasing the holding of the data as the information on the management method.

(5) The wireless communication device according to any one of (1) to (4), wherein the transmission control unit controls transmission of hold request information requesting to hold an amount of the reception result corresponding to the number of the plurality of bands as the information on the management method.

(6) The wireless communication device according to (5), wherein the transmission control unit determines the amount of the data to be transmitted in the communication on the basis of information including a reply to the hold request information.

(7) The wireless communication device according to any one of (1) to (6), wherein the transmission control unit performs control so that information on the notification method is transmitted together with a request for the reception result.

(8) The wireless communication device according to any one of (1) to (7), wherein the transmission control unit performs control so that a signal including information on the notification method is transmitted using a band in which completion of transmission of data is the latest among the plurality of bands.

(9) The wireless communication device according to any one of (1) to (7), wherein the transmission control unit adds information on the notification method to the data.

(10) The wireless communication device according to (9), wherein the transmission control unit controls transmission of information for replacing ACK Policy of the data whose reception started earlier in the communication as the information on the management method.

(11) The wireless communication device according to (9) or (10), wherein the transmission control unit sets a length of the data to be transmitted in another band according to a length of the data including the information on the notification method.

(12) A wireless communication method in a wireless communication device, including: collectively managing a sequence number of data transmitted using each band in communication using a plurality of bands and controlling transmission of information on a notification method of a reception result of the data and information on a management method.

(13) A wireless communication device including: a reception control unit that controls reception of information on a notification method of a reception result of data and information on a management method, the data being transmitted such that a sequence number of data transmitted using each band in communication using a plurality of bands is collectively managed; and a transmission control unit that controls transmission of the reception result using a band specified in the information on the notification method.

(14) The wireless communication device according to (13), wherein the reception control unit transitions to a state in which reception using the plurality of bands is possible on the basis of the information received as the information on the management method and indicating that the data is collectively managed and transmitted.

(15) The wireless communication device according to (13) or (14), wherein the reception control unit determines whether the data is to be held or discarded on the basis of the information on the sequence number of the start data in the communication, received as the information on the management method.

(16) The wireless communication according to (13) or (14), wherein the reception control unit determines whether the data is to be held or discarded on the basis of the information for instructing to hold the data and the information for releasing the holding of the data, which are received separately as the information on the management method.

(17) The wireless communication device according to any one of (13) to (16), wherein the transmission control unit controls transmission of a response that the reception result can be held or information on a holdable amount on the basis of the hold request information requesting to hold an amount of the reception result corresponding to the number of the plurality of bands, received as the information on the management method.

(18) The wireless communication device according to any one of (13) to (17), wherein the reception control unit replaces with No ACK, ACK Policy of the received data on the basis of the information for replacing the ACK Policy of the data whose reception started earlier in the communication, the information being received as the information on the management method.

(19) The wireless communication device according to any one of (13) to (18), wherein the transmission control unit controls transmission of the reception result in response to a request for the reception result received together with the information on the notification method.

(20) A wireless communication method in a wireless communication device, including: receiving information on a notification method of a reception result of data and information on a management method, the data being transmitted such that a sequence number of data transmitted using each band in communication using a plurality of bands is collectively managed; and transmitting the reception result using a band in which the information on the notification method is received.

REFERENCE SIGNS LIST

11 Wireless communication device
12 Wireless communication device
31 Control unit
32 Power supply unit
31, 33-1 to 33-3 Communication unit
50 Storage unit
51 Data processing unit
52 Wireless control unit
53 Modulation/demodulation unit
54 Signal processing unit
55 Channel estimation unit
56, 56-1 to 56-N Wireless I/F unit
57, 57-1 to 57-N Amplifier unit
58-1 to 58-N Antenna
61 Transmission control unit
62 Reception control unit

The invention claimed is:

1. A wireless communication device configured to communicate with a terminal via one or more frequency bands and comprising:
a transmitter; and
control circuitry that:
transmits one or more first packets of data via a single frequency band to the terminal;

while transmitting the one or more first packets of data to the terminal via the single frequency band, obtains a transmission right for use of at least one additional frequency band;

based on the transmission right, transmits information to the terminal, the information including Multi Band Operations (MBO) information informing the terminal that:

further packets of data are to be transmitted to the terminal via the single frequency band and the at least one additional frequency band, and sequence numbers of packets of data to be transmitted to the terminal via the single frequency band and the at least one additional frequency band are collectively managed by the wireless communication device, wherein the terminal shifts to a mode of operations for processing the collectively managed sequence numbers based on the MBO information, and transmits the further packets of data to the terminal via the single frequency band and the at least one additional frequency band in accordance with a time of arrival of the packets of data at the wireless communication device.

2. The wireless communication device according to claim 1, wherein the control circuitry further receives an MBO information response from the terminal indicating that the terminal has shifted to the mode of operations for processing the collectively managed sequence numbers.

3. The wireless communication device according to claim 1, wherein the information transmitted to the terminal further includes a hold request instructing the terminal to hold from processing the packets of data that are collectively managed by the wireless communication device until a last packet of the data is received by the terminal.

4. The wireless communication device according to claim 3, wherein the hold request indicates a number of sequence numbers that should be held from processing by the terminal, and the MBO information response further includes a hold response that indicates whether the terminal is able to hold the number of sequence numbers indicated in the hold request or whether the terminal is able to hold an alternative number of sequence numbers less than the number of sequence numbers indicated in the hold request.

5. The wireless communication device according to claim 4, wherein the control circuitry determines a total number of packets of the data to be transmitted to the terminal via the single frequency band and the at least one additional frequency band based on the hold response.

6. The wireless communication device according to claim 1, wherein the MBO information indicates that one or more packets of data transmitted prior to transmitting the MBO information are part of the packets of data that are collectively managed.

7. The wireless communication device according to claim 1, wherein, upon completing transmitting all of the packets of data to the terminal via the single frequency band and the at least one additional frequency band, the control circuitry:

transmits a sequence number reception result request to the terminal that requests that the terminal transmit a reception result for each sequence number of the packets of data that are collectively managed by the wireless communication device, and receives, from the terminal, the reception result for each sequence number of the packets of data that are collectively managed by the wireless communication device.

8. The wireless communication device according to claim 7, wherein the control circuitry:

determines whether any criterion of a set of predetermined criteria is satisfied, based on one criterion of the set of predetermined criteria being satisfied, determines which of the single frequency band and the at least one additional frequency band is to be used to transmit the sequence number reception result request.

9. The wireless communication device according to claim 8, wherein the set of predetermined criteria consists of:

a first criterion corresponding to where there is no band for which any transmission right can be acquired before the completing the transmitting of all of the packets, a second criterion corresponding to:

a total packet length of packets transmitted beginning the transmission via the single frequency band and the at least one additional frequency band is larger than a preset threshold of a total transmission time in the single frequency band and the at least one additional frequency band, a total elapsed time of transmission is larger than a preset elapsed time threshold, or a number of acquisition times of communication opportunities during transmission of via the single frequency band and the at least one additional frequency band is larger than a preset threshold number of acquisition times of communication opportunities, and a third criterion where a number of packets of data to be transmitted in a transmission queue is equal to or less than a preset threshold.

10. The wireless communication device according to claim 8, wherein based on the one criterion of the set of predetermined criteria being satisfied, the control circuitry:

selects a frequency band of the single frequency band and the at least one additional frequency band having a latest packet transmission time as a frequency band to be used to transmit the sequence number reception result request; and transmits the sequence number reception result request to the terminal via the selected frequency band.

11. A wireless communication method performed by a wireless communication device configured to communicate with a terminal via two or more frequency bands, the method comprising:

transmitting one or more first packets of data via a single frequency band to the terminal;

while transmitting the one or more first packets of data to the terminal via the single frequency band, obtaining a transmission right for use of at least one additional frequency band;

based on the transmission right, transmitting information to the terminal, the information including Multi Band Operations (MBO) information informing the terminal that:

further packets of data are to be transmitted to the terminal via the single frequency band and the at least one additional frequency band, and sequence numbers of packets of data to be transmitted to the terminal via the single frequency band and the at least one additional frequency band are collectively managed by the wireless communication device, wherein the terminal shifts to a mode of operations for processing the collectively managed sequence numbers based on the MBO information; and transmitting the further packets of data to the terminal via the single frequency band and the at least one additional frequency band in accordance with a time of arrival of the packets of data at the wireless communication device.

12. A wireless communication device comprising:
a transmitter;
a receiver; and
control circuitry that:
receives one or more first packets of data via a single frequency band from a terminal;
while receiving the one or more first packets of data from the terminal via the single frequency band, receive information from the terminal, the information including Multi Band Operations (MBO) information informing the wireless communication device that:
  further packets of data are to be transmitted from the terminal via the single frequency band and at least one additional frequency band, and
  sequence numbers of packets of data to be transmitted from the terminal via the single frequency band and the at least one additional frequency band are collectively managed by the terminal,
shifts to a mode of operations for processing the collectively managed sequence numbers based on the MBO information, and
receives the further packets of data from the terminal via the single frequency band and the at least one additional frequency band.

13. The wireless communication device according to claim 12, wherein the control circuitry further transmits an MBO information response to the terminal indicating that the wireless communication device has shifted to the mode of operations for processing the collectively managed sequence numbers.

14. The wireless communication device according to claim 13, wherein the information received from the terminal further includes a hold request instructing the wireless communication device to hold from processing the packets of data that are collectively managed by the wireless communication device until a last packet of the data is received by the terminal.

15. The wireless communication device according to claim 14, wherein the hold request indicates a number of sequence numbers that should be held from processing by the wireless communication device, and the MBO information response further includes a hold response that indicates whether the wireless communication device is able to hold the number of sequence numbers indicated in the hold request or whether the wireless communication device is able to hold an alternative number of sequence numbers less than the number of sequence numbers indicated in the hold request.

16. The wireless communication device according to claim 12, wherein the MBO information indicates that one or more packets of data transmitted prior to transmitting the MBO information are part of the packets of data that are collectively managed.

17. The wireless communication device according to claim 12, wherein, upon completing reception of all of the packets of data from the terminal via the single frequency band and the at least one additional frequency band, the control circuitry:
receives a sequence number reception result request from the terminal that requests that the wireless communication device transmit a reception result for each sequence number of the packets of data received from the terminal via the single frequency band and the at least one additional frequency band, and
transmits, to the terminal, the reception result for each sequence number of the packets of data received from the terminal via the single frequency band and the at least one additional frequency band.

18. The wireless communication device according to claim 17, wherein the control circuitry receives the sequence number reception result request from the terminal via a frequency band of the single frequency band and the at least one additional frequency band having a latest packet transmission time.

19. A wireless communication method performed by a wireless communication device configured to communicate with a terminal via two or more frequency bands, the method comprising:
receiving one or more first packets of data via a single frequency band from a terminal;
while receiving the one or more first packets of data from the terminal via the single frequency band, receiving information from the terminal, the information including Multi Band Operations (MBO) information informing the wireless communication device that:
  further packets of data are to be transmitted from the terminal via the single frequency band and at least one additional frequency band, and
  sequence numbers of packets of data to be transmitted from the terminal via the single frequency band and the at least one additional frequency band are collectively managed by the terminal,
shifts to a mode of operations for processing the collectively managed sequence numbers based on the MBO information, and
receiving the further packets of data from the terminal via the single frequency band and the at least one additional frequency band.

* * * * *